(12) United States Patent
Dodge et al.

(10) Patent No.: US 7,218,779 B2
(45) Date of Patent: May 15, 2007

(54) INK DIVIDER AND ASSOCIATED APPLICATION PROGRAM INTERFACE

(75) Inventors: Steve Dodge, Sammamish, WA (US); Alexander Gounares, Kirkland, WA (US); Arin J Goldberg, Woodinville, WA (US); Bodin Dresevic, Bellevue, WA (US); Jerome J Turner, Redmond, WA (US); Matthew Paul Rhoten, Seattle, WA (US); Robert L Chambers, Sammamish, WA (US); Sashi Raghupathy, Redmond, WA (US); Timothy H Kannapel, Bellevue, WA (US); Tobiasz Zielinski, Redmond, WA (US); Zoltan C Szilagyi, Redmond, WA (US)

(73) Assignee: Microsoft Corporation, Redmond, CA (US)

( * ) Notice: Subject to any disclaimer, the term of this patent is extended or adjusted under 35 U.S.C. 154(b) by 866 days.

(21) Appl. No.: 10/347,331

(22) Filed: Jan. 21, 2003

(65) Prior Publication Data

US 2004/0141648 A1 Jul. 22, 2004

(51) Int. Cl.
*G06K 9/34* (2006.01)
(52) U.S. Cl. ............... 382/177; 382/178; 382/180; 382/202; 382/203
(58) Field of Classification Search ............... 382/177, 382/178, 180, 202, 203
See application file for complete search history.

(56) References Cited

U.S. PATENT DOCUMENTS 5,425,110 A * 6/1995 Spitz .................. 382/192
5,517,578 A 5/1996 Altman et al.
5,784,504 A 7/1998 Anderson et al.
5,889,523 A 3/1999 Wilcox et al.

(Continued)

FOREIGN PATENT DOCUMENTS

WO WO 01-67222 A2 9/2001

OTHER PUBLICATIONS

Sashi Raghupathy, "Ink Parsing in Tablet PC", Microsoft Research Faculty Summit, Online, pp. 1-7, 2002.

(Continued)

*Primary Examiner*—Bhavesh M Mehta
*Assistant Examiner*—John B Strege
(74) *Attorney, Agent, or Firm*—Banner & Witcoff, Ltd

(57) ABSTRACT

Methods for communicating between an application and an ink divider object (which stores ink strokes to be divided into groups) may include: (a) issuing a divide request to the ink divider object, optionally by the application; (b) in response to the divide request, calling a divide method, which groups the stored ink strokes into one or more groupings of strokes having a first predetermined granularity (e.g., words, lines, paragraphs, sentences, drawings, etc.); and (c) making information regarding the one or more groupings of strokes available to the application. This "information" made available to the application may include, for example, the actual groupings of the strokes, the number of stroke groupings having the first predetermined granularity, machine generated text corresponding to the stroke groupings, or the like. The results of the divide method may be stored in an ink division result object. In some examples, the ink division result object may include the originally divided strokes and allow retrieval of groupings of strokes of various different granularities. This invention also relates to systems for performing the above methods and various data structures used in performing these methods.

40 Claims, 11 Drawing Sheets

U.S. PATENT DOCUMENTS

| | | | | |
|---|---|---|---|---|
| 5,892,843 | A | * | 4/1999 | Zhou et al. .................. 382/176 |
| 5,903,668 | A | * | 5/1999 | Beernink .................... 382/187 |
| 6,035,063 | A | * | 3/2000 | Nakashima et al. ........ 382/187 |
| 7,050,632 | B2 | * | 5/2006 | Shilman et al. ............. 382/186 |
| 2003/0007683 | A1 | * | 1/2003 | Wang et al. ................ 382/159 |

OTHER PUBLICATIONS

About Ink Analysis with the Divider Object, Microsoft Developers' Network Msdn, Online, pp. 1-8, Jan. 2003.

W.G. Aref et al., "On Handling Electronic Ink", ACM Computing Surveys, vol. 27, No. 4, pp. 564-567, Dec. 1995.

Scott Leibs, "The Light Stuff", CFO Magazine, Online, Jan. 2003.

European Search Report dated May 19, 2004.

S. Smithies, et al., "Equation Entry and Editing Via Handwriting and Gesture Recognition," Behaviour & Information Technology, 2001, vol. 20, No. 1, 53-67.

T. Lin et al., "Coarse Classification of On-Line Chinese Characters via Structure Feature-Based Method," Pattern Recognition, vol. 27, No. 10, pp. 1365-1377, 1994.

T. Moran, et al., "Pen-Based Interaction Techniques for Organizing Material on an Electronic Whiteboard," UIST '97: Proc. of the ACM Symposium on User Interface Software and Technology, Banff, Alberta, Canada, Oct. 14-17, 1997, pp. 45-54.

G. Kim, et al., "An Architecture for Handwritten Text Recognition Systems," *International Journal on Document Analysis and Recognition* (1999) 2:37-44.

S. Clergeau-Tournemire, et al., "Integration of Lexical and Syntactical Knowledge in a Handwriting-Recognition System," Machine Vision and Applications (1995) 8:249-259.

V. Govindaraju, et al., "Handwritten Text Recognition," Int'l Assn. for Pattern Recognition Workshop on Document Analysis Systems, 1995, pp. 288-304.

H. Raafat et al., "A Tree Structured Neural Network," Proc. of the Second Int'l Conf. on Document Analysis and Recognition, Oct. 20-22, 1993, Tsukuba Science City, Japan, pp. 939-941.

S. Srihari et al., "Document Image-Processing System for Name and Address Recognition," Int'l J. of Imaging Systems and Technology, (1996), vol. 7, pp. 379-391.

J. Shin, "Online Cursive Hangul Character Recognition Based on Dynamic Programming," Proc. Sixth Int'l Conf. on Document Analysis and Recognition, Sep. 10-13, 2001, Seattle, WA, pp. 810-814.

S. Srihari et al., "A System to Read Names and Addresses on Tax Forms," Proc. of the IEEE, vol. 84, No. 7, Jul. 1996, pp. 1038-1049.

* cited by examiner

INK DIVIDER AND ASSOCIATED APPLICATION PROGRAM INTERFACE

RELATED APPLICATIONS

In general, the present invention may be used in conjunction with the systems and methods disclosed in the following patent applications:

(a) U.S. patent application Ser. No. 10/143,865, filed May 14, 2002, entitled "Handwriting Layout Analysis of Freeform Digital Ink Input;"

(b) U.S. patent application Ser. No. 10/143,864, filed May 14, 2002, entitled "Classification Analysis of Freeform Digital Ink Input;"

(c) U.S. patent application Ser. No. 10/143,804, filed May 14, 2002, entitled "An Incremental System for Real Time Digital Ink Analysis;" and (d) U.S. patent application Ser. No. 10/184,108, filed Jun. 28, 2002, entitled "Interfacing With Ink."

Each of these co-pending U.S. patent applications is entirely incorporated herein by reference.

FIELD OF THE INVENTION

Aspects of the present invention relate to systems, methods, and computer-readable media that facilitate communication between an application program and electronic ink, including various ink and ink divider objects. Some examples of such systems, methods, and computer-readable media enable application program or client code access to ink stroke groupings of various granularity to improve performance of the application programs and allow improved interaction of these programs and their associated code with digital ink.

BACKGROUND

Typical computer systems, especially computer systems using graphical user interface (GUI) systems, such as Microsoft WINDOWS, are optimized for accepting user input from one or more discrete input devices, such as a keyboard for entering text and a pointing device (e.g., a mouse with one or more buttons), for driving the user interface. The ubiquitous keyboard and mouse interface provides for fast creation and modification of documents, spreadsheets, database fields, drawings, photos and the like. However, in some respects, there is a significant gap in the flexibility provided by the keyboard and mouse interface as compared with the non-computer (i.e., conventional) pen and paper. With conventional pen and paper, a user may edit a document, write notes in a margin, and draw pictures and other shapes, and the like. In some instances, a user may prefer to use a pen to mark-up a document rather than review the document on a computer screen because of the ability to freely make notes outside of the confines of the keyboard and mouse interface.

Some computer systems permit users to draw on a screen. For example, the Microsoft READER application allows users to add electronic ink (also referred to herein as "ink" or "digital ink") to a document. The system stores the ink and provides it to a user when requested. Other applications (for example, drawing applications as known in the art associated with the Palm 3.x and 4.x and PocketPC operating systems) permit the capture and storage of drawings. Also, various drawing applications, such as Corel Draw, and photo and editing applications, such as Photoshop, may be used with stylus based input products, such as the Wacom tablet product. These drawings include other properties associated with the ink strokes used to make up the drawings. For instance, line width and color may be stored with the ink. One goal of these systems is to replicate the look and feel of physical ink being applied to a piece of paper.

While computer systems that accept electronic ink are known, at present time their availability and usefulness, in at least some respects, are somewhat limited. To further increase their availability and usefulness, application programs must include code that allows interaction and interfacing with the electronic ink. Accordingly, an application programming interface ("API") that allows code writers to readily, flexibly, and consistently interact and interface with various different groupings of ink would be very useful to those who wish to write code for application programs that interact in some manner with electronic ink.

SUMMARY

Applications that implement freeform drawing surfaces where, for example, users can input and interact with electronic ink on a page, are faced with the challenge of determining at what scope to store and manipulate the strokes that the user provides. The straightforward approaches for an application developer are: (1) treat each stroke individually or (2) treat all strokes on a page, or in a given editing session, together. Each of these approaches, however, has serious practical limitations in terms of ease of use for the end user as well as compatibility with existing document layout code. The ideal approach for an application, but one that is ordinarily quite difficult to implement, is to treat the strokes in groups comprising words, lines, or paragraphs. This approach has great benefits for ease of use, compatibility, making possible improved handwriting recognition and many other features, etc. This invention produces APIs that application developers can use to easily get these benefits without having to determine themselves how to group the strokes, thus removing a major difficulty of this approach.

Aspects of the present invention relate to systems and methods for making information available to an application program. These systems and methods may include: storing a plurality of ink strokes; issuing or receiving a divide request; in response to the divide request, grouping the stored ink strokes into one or more groupings of strokes having at least a first predetermined granularity; and making information regarding the one or more groupings of strokes available to the application program. The "information" made available to the application program may include, for example, at least one of the one or more groupings of strokes; information indicating a number of groupings of strokes having the first predetermined granularity; and machine-generated text that corresponds to at least one of the one or more groupings of strokes. The strokes may be grouped into various different granularities, such as groups containing words, lines, paragraphs, sentences, drawings, etc. The grouping action also may group the strokes into groupings of more than one different granularity, and it may be repeated after the ink stroke set is changed, for example, by adding, deleting, moving, resizing, or otherwise modifying one or more strokes. Application program code also can provide various types of parsing information to the parser during operation of the methods described above, such as setting the recognizer to use during parsing, setting a language to be used during parsing, setting a desired granularity into which the strokes will be parsed, setting expected line heights for lines of text included in the ink strokes, and the like.

Additional aspects of the present invention relate to systems and methods for communicating between an application and an ink divider object that stores ink strokes to be divided into groups. In some examples, the systems and methods include: (a) issuing a divide request to the ink divider object, optionally by the application; (b) in response to the divide request, calling a divide method, which groups the stored ink strokes into one or more groupings of strokes having at least a first predetermined granularity (e.g., words, lines, paragraphs, sentences, drawings, etc.); and (c) making information regarding the one or more groupings of strokes available to the application. The results of the divide method may be stored in an ink division result object. In some examples, the ink division result object may include (and allow application program access to) the originally divided ink strokes and may allow retrieval of groupings of strokes of various different granularities. In additional examples of the invention, the divide method may use a predetermined or preset language characteristic associated with the ink strokes to assist in better defining the groupings of ink strokes.

Still additional aspects of the present invention relate to computer-readable media having computer-executable instructions stored thereon for performing the various methods generally described above. Additional aspects of the present invention relate to computer-readable media having data structures stored thereon for various ink divider objects, ink division result objects, ink division units objects, and ink division unit objects.

These and other features and aspects of the present invention will be more apparent upon consideration of the following detailed description and the drawings.

BRIEF DESCRIPTION OF THE DRAWINGS

The foregoing Summary, as well as the following Detailed Description, is better understood when read in conjunction with the accompanying drawings, which are included by way of example, and not by way of limitation with regard to the claimed invention.

DETAILED DESCRIPTION

The following description is divided into sub-sections to assist the reader. The sub-sections include: Terms; General-Purpose Computer; General Background on Ink Layout Analysis and Classification Analysis; The Ink Divider Object and API; Operation of the Ink Divider Object and API; Application Programming Interfaces; An Alternative Ink Divider Object; and Conclusion.

I. Terms

Ink—A sequence or set of one or more strokes, optionally with properties. A sequence of strokes may include strokes in an ordered form. The sequence may be ordered by the time captured or by where the strokes appear on a page. Other orders also are possible. A set of strokes may include sequences of strokes or unordered strokes or any combination thereof. Ink may be expanded to include additional properties, methods, trigger events, and the like.

Ink object—A data structure storing one or more ink strokes, with or without properties, methods, and/or events.

Stroke—A sequence or set of captured points. For example, when rendered, a sequence of points may be connected with lines. Alternatively, a stroke may be represented as a point and a vector in the direction of the next point. In short, a stroke is intended to encompass any representation of points or segments relating to ink, irrespective of the underlying representation of points and/or what connects the points.

Point—Information defining a location in space. For example, points may be defined relative to a capturing space (for example, points on a digitizer), a virtual ink space (the coordinates in a space into which captured ink is represented or stored), and/or display space (the points or pixels of a display device).

Render—The process of determining how graphics and/or ink are to be displayed, whether on a screen, printed, or output into another data format.

Inking Session—A period of time from when an application begins creating or editing ink until a parser (e.g., an ink divider object) is called upon to examine the ink strokes and return parsed ink entities. The parser may be called multiple times during a given inking session, and strokes may be added, deleted, or otherwise modified in between calls of the parser.

II. General-Purpose Computer

Figure 1:
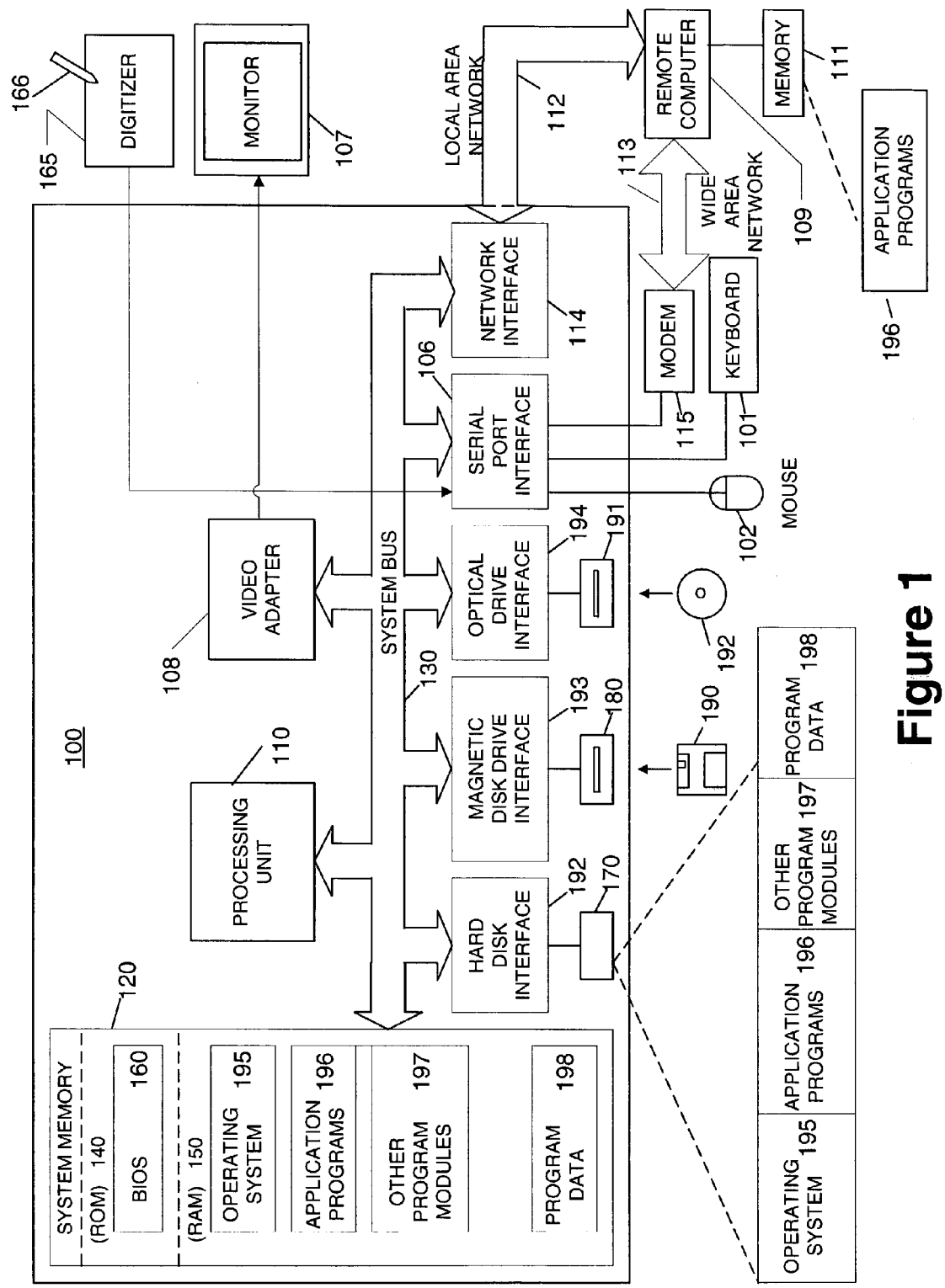
FIG. 1 shows a schematic diagram of a general-purpose digital computing environment that can be used to implement various aspects of the invention.

FIG. 1 illustrates a schematic diagram of an example of a conventional general-purpose digital computing environment that may be used to implement various aspects of the present invention. In FIG. 1, a computer 100 includes a processing unit or system 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using wired and wireless communication systems.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
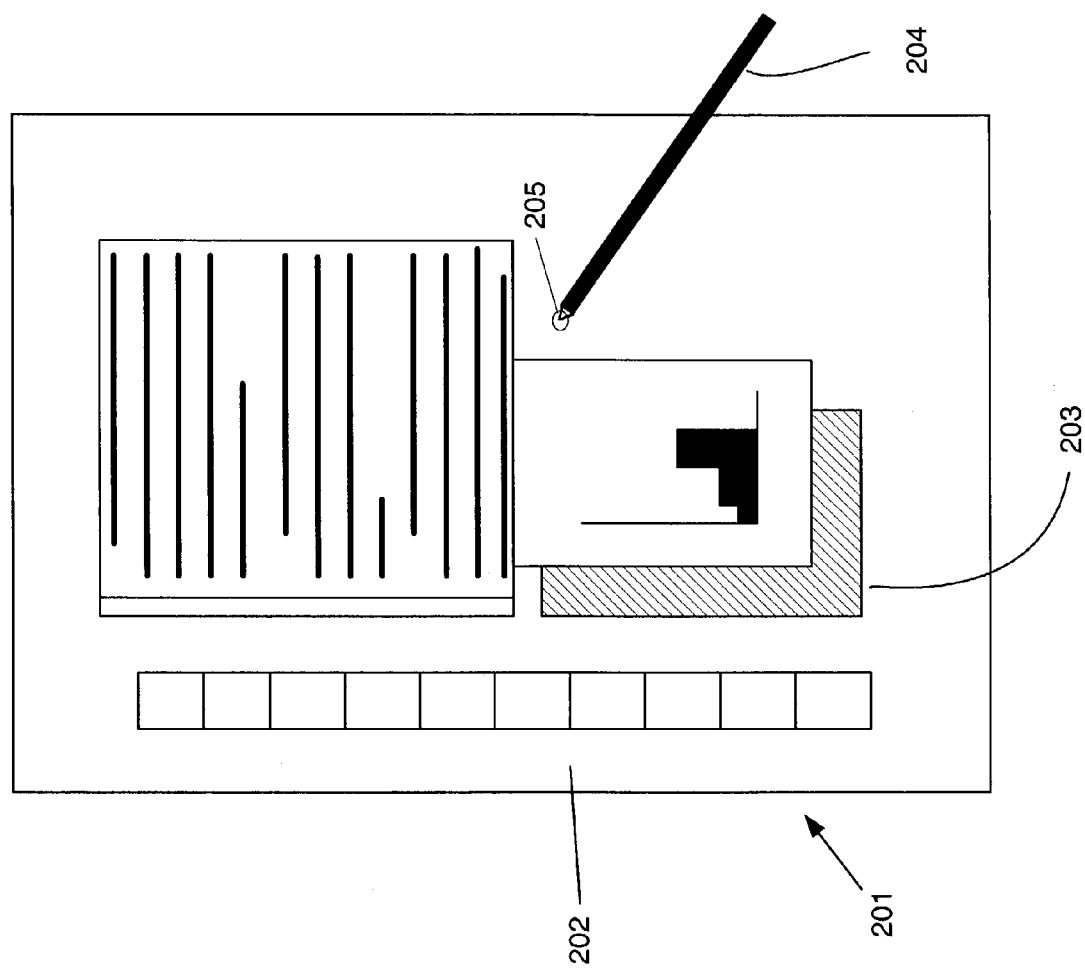
FIG. 2 shows a plan view of a stylus-based computing system that can be used in accordance with various aspects of the present invention.

FIG. 2 illustrates an example of a pen-based or stylus-based computing system 201 that may be used in conjunction with various aspects of the present invention. Any or all of the features, subsystems, and functions in the system of FIG. 1 may be included in the computer of FIG. 2. Pen-based computing system 201 includes a large display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electro-magnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end. When moved across the display as an eraser, the eraser indicates portions of the display to be erased. Other types of input devices, such as a mouse, trackball, or the like, also may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204. Region 205 shows a feedback region or contact region permitting the user to determine where the stylus 204 contacted the display surface 202.

An application program interface and systems and methods according to examples of this invention may be used with pen-based computing systems that accept and process electronic ink and ink strokes, like those described above in conjunction with FIG. 2.

III. General Background on Ink Layout Analysis and Classification Analysis

A. General Description of an Overall Ink Analysis System and Method

To aid in understanding the present invention, it is useful to review some background information on ink "layout analysis" and ink classification analysis (also called "ink parsing"). While any suitable data processing systems and methods may be used without departing from this invention, in some examples of the invention layout analysis systems and methods like those described in U.S. patent application Ser. No. 10/143,865, filed May 14, 2002, may be used, and in some examples of the invention, classification analysis systems and methods like those described in U.S. patent application Ser. No. 10/143,864, filed May 14, 2002, may be used. In general, parsing of ink may take place in any suitable manner without departing from this invention.

Figure 3:
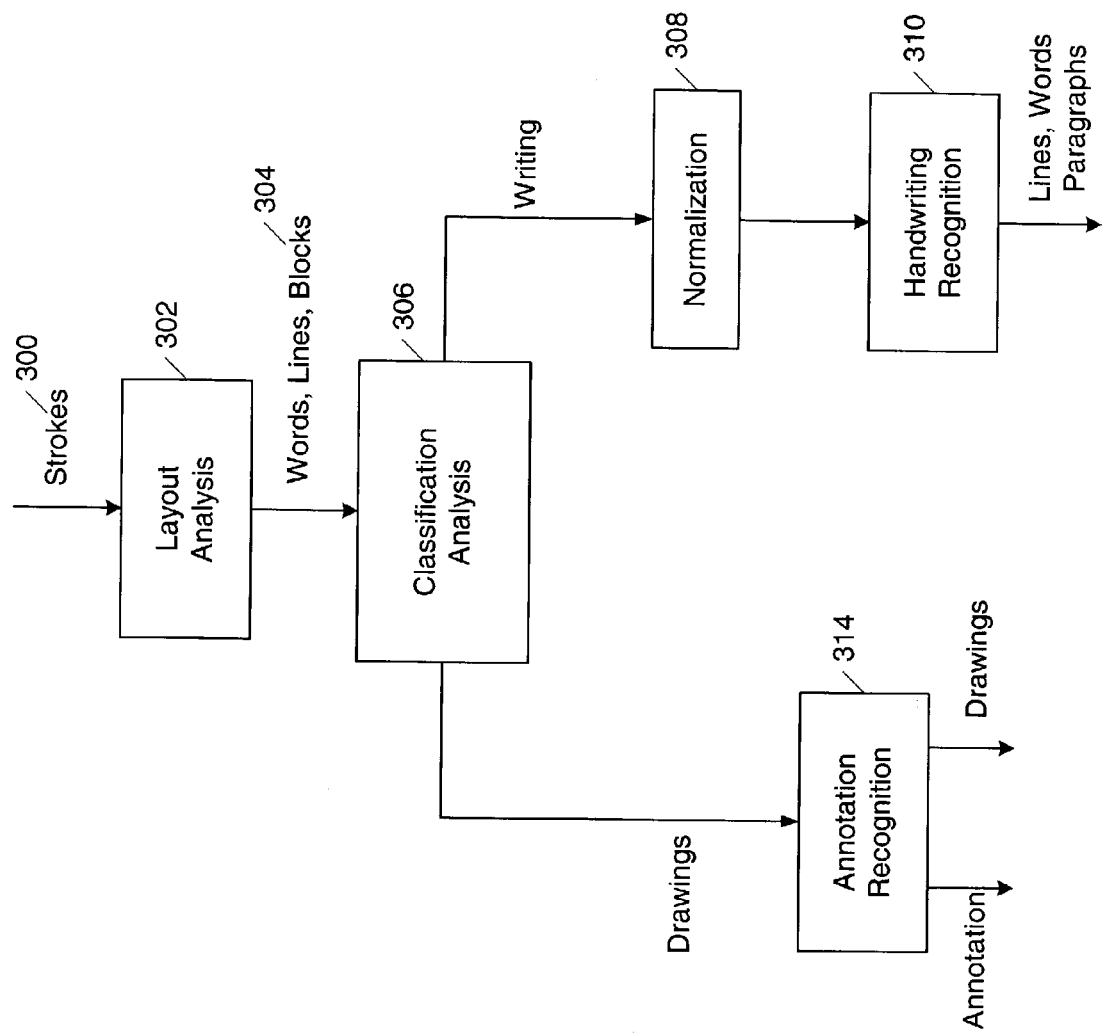
FIG. 3 shows a general overview of an example of a parsing system and/or method that may be used in conjunction with examples of this invention.

FIG. 3 is a schematic diagram that generally illustrates an example of an overall system and method in which ink may be parsed or divided in some examples of this invention. In the example of FIG. 3, incoming or input ink strokes 300 first are subjected to a layout analysis procedure 302, which combines and parses the input ink strokes 300 into associated stroke sets, such as words, lines, paragraphs (or blocks), and/or other groupings 304. In general, the layout analysis method or system 302 ascertains certain information relating to the size and layout of ink strokes 300 on a page, and groups together certain strokes based on size, layout, etc. An example of such a system or method is described in more detail in conjunction with FIGS. 5, 6A, and 6B.

After layout analysis 302, the data may be introduced into a variety of additional ink analysis engines. In the example system illustrated in FIG. 3, the data is next introduced to a classification analysis system or engine 306. This classification analysis system or engine 306 determines the type(s) of strokes included in the specific input data (e.g., whether individual strokes or stroke sets represent flow diagrams, freeform drawings, handwritten text, music, mathematics, charts, graphs, etc.). In some examples of the invention, if desired, a user may "inform" the system as to the type of input strokes, e.g., by selecting a "drawing mode," a "text mode," or the like, or by assigning a specific stroke type to one or more strokes (e.g., using a block or lasso select and assign procedure).

Further processing of the input ink may depend on the stroke type recognized by the classification analysis system or engine 306 (or otherwise determined). For example, for strokes or stroke sets that are classified as textual handwriting, the so-classified stroke sets may be sent to a handwriting recognition system 310 or another appropriate processing system. If necessary or desired, prior to introduction into the handwriting recognition system 310 or other processing system, the input ink data may be "normalized" using a normalization algorithm or system 308, to place the input ink data in an optimum orientation for analysis by the handwriting recognition system 310 or other processing system (e.g., to rotate slanted input text strokes to a horizontal base line, if necessary). Conventional normalization systems or methods 308 and/or handwriting recognition systems or methods 310 may be used (if necessary and/or desired) without departing from the present invention. The data output from the handwriting recognition system or method 310 may constitute or link to machine-generated text (e.g., lines, words, paragraphs, etc.) usable in any conventional manner, such as in conventional word processing systems (e.g., Microsoft WORD® or the like), e-mail handling systems, calendars, appointment books, etc.

As another example, as illustrated in FIG. 3, if the classification analysis engine 306 recognizes the input strokes or stroke sets as containing drawing strokes, this data may then be transferred to an annotation recognition system or method 314, which can be used, for example, to recognize textual information in the drawing. Further processing can proceed in any suitable manner. For example, if desired, the drawings may be "cleaned-up," wherein the handwritten annotations may be replaced with machine-generated text, handwritten drawing lines or shapes (e.g., circles, triangles, rectangles, etc.) may be replaced with machine-generated elements, and the like. Also, the drawings (either the handwritten versions or later machine-generated versions) can be introduced into any suitable programs or systems without departing from this invention.

The classification analysis systems and methods 306 used in some examples of the invention also may recognize other specific writing or drawing types without departing from the invention. For example, a classification analysis system may recognize input stroke sets as containing music notations, mathematical information (such as formulas, mathematical symbols (+, −, =, %, ×, sin, cos, tan, etc.), and the like), tables, charts, graphs, flow diagrams, schematic diagrams, drawings, sketches, doodles, etc., without departing from the invention. Such stroke sets, if present, could be sent to more specialized recognition systems and/or to other suitable processing applications without departing from the present invention.

Some or all of the functions described in conjunction with FIG. 3 could be performed on input ink data after a user completely enters all ink onto the electronic page or document (e.g., upon a user's command, such as a "save," "parse," "close," or "recognize" command). Because of the computer processing time required to perform typical layout analyses and handwriting recognition analyses, however, a user may experience significant delays if processing were conducted on this very infrequent, ad hoc basis. These processing delays may last long enough such that the user would become frustrated waiting for the computer system to complete its analyses before moving on to the next desired operations (e.g., entering more ink, moving on to a new page, printing, opening a new document or application, etc.), particularly if the electronic document is long or contains a large volume of ink.

Systems and methods according to at least some examples of the present invention allow pen-based computing systems to perform various analyses, such as layout analysis 302, classification analysis 306, handwriting recognition analysis 310, etc., incrementally, in real time, while users continue using the pen-based computing systems (e.g., to enter and/or modify the ink strokes on the page). Moreover, in some examples of the systems and methods according to the invention, the various parser engines operate in a background thread, on a "snapshot" of the application data structure, in order to minimize the time that the application data structure is unavailable to the user for entering ink (the term "application data structure," as used herein, means a data structure used in connection with an application program). While any suitable incremental data analysis systems and methods may be used without departing from the invention, examples of suitable systems and methods are described in U.S. patent application Ser. No. 10/143,804, filed May 14, 2002.

Figure 4:
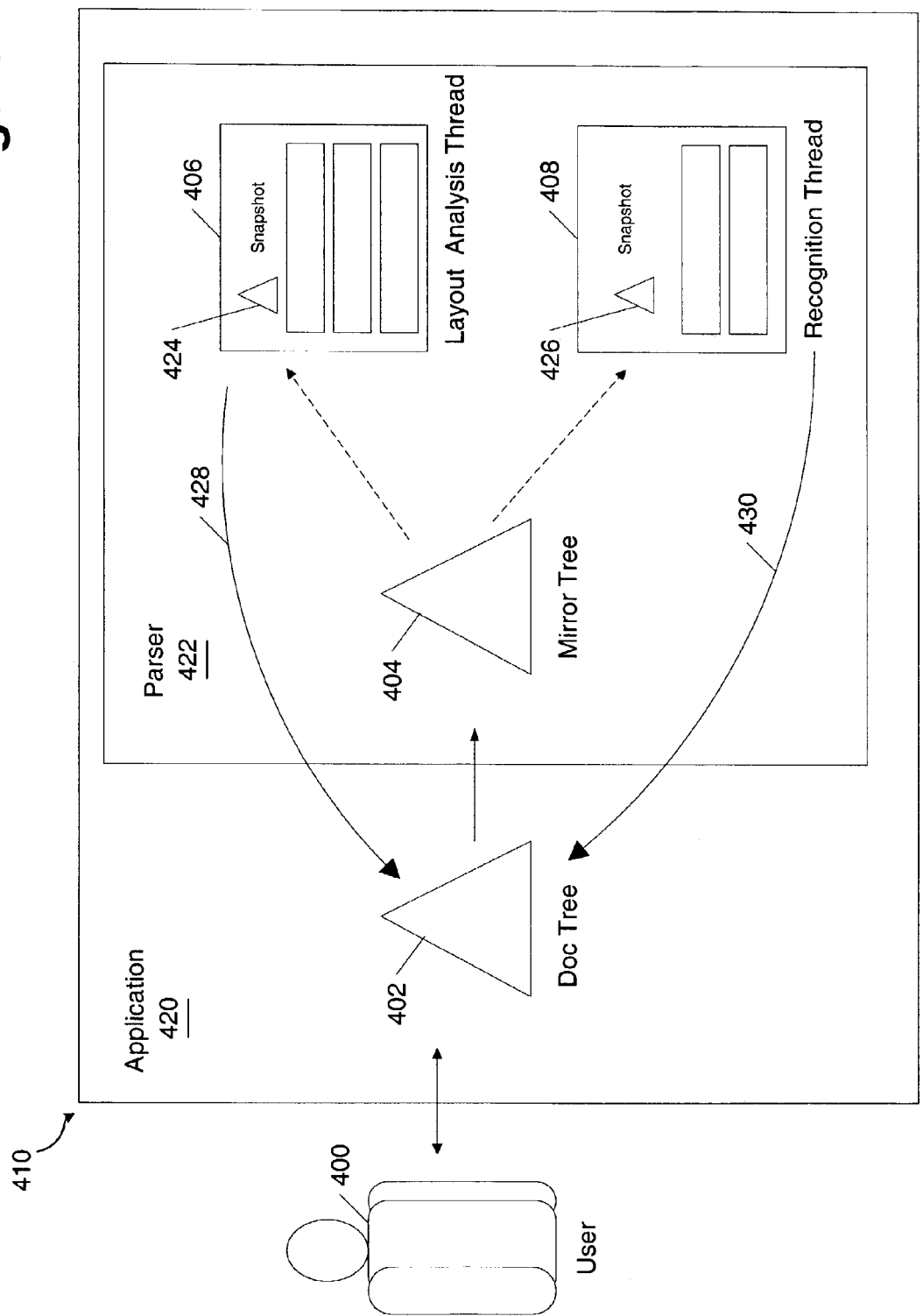
FIG. 4 shows a diagram generally explaining incremental parsing processing that may be used in conjunction with examples of this invention.

B. Description of Example Systems and Methods for Layout Analysis and Classification FIG. 4 illustrates a schematic diagram of one example of a system useful for practicing the present invention. As illustrated, the overall system 410 includes an application system or program 420, which includes or communicates with a parser 422. The overall system 410 may be embodied in a pen-based computing system like that illustrated in FIG. 2. The user 400 enters ink strokes into the system 410 (or the ink strokes are downloaded, e.g., from memory or an external source), and the ink strokes are stored by the application program 420, for example, in an application data structure 402 (which may be thought of as a document tree data structure 402, like those illustrated in FIGS. 6A and 6B). So that the user 400 can continue to make changes to the document tree data structure 402 while the parser 422 operates, the parser 422 contains a mirror tree data structure 404. Changes made to the document tree data structure 402 (e.g., by the user 400, the parser 422, from another source, etc.) are immediately passed on to the mirror tree data structure 404 so that the mirror tree data structure 404 generally "mirrors" the content of the document tree data structure 402.

The mirror tree data structure 404 is used to supply input data to the two analysis engines 406 and 408 in the parser 422. In the example illustrated in FIG. 4, one analysis engine is a layout analysis engine 406 (which may conduct, for example, a layout analysis 302, as discussed above in conjunction with FIG. 3), and the other is a recognition engine 408 (which may conduct, for example, handwriting recognition analysis 310 and/or annotation recognition analysis 314, as discussed above in conjunction with FIG. 3). The engines 406 and 408 receive "snapshots" 424 and 426, respectively, of the mirror tree data structure 404 as input data, and they operate on these "snapshots" 424 and 426 in background instead of operating directly on the document tree data structure 402 or the mirror tree data structure 404. In this manner, the user 400 can continue performing operations on the document tree data structure 402 in the application program 420 (e.g., adding ink, deleting ink, modifying ink, etc.) while the various parser analysis engines 406 and 408 also are operating, and the user 400 does not experience significant interruptions in operation (e.g., processing delays) as the engines 406 and 408 operate on the data.

To produce "snapshots" 424 and 426 in some examples, existing snapshot data structures may be compared with the mirror tree data structure 404. The differences between the two are noted, and a minimal number of operations are performed to synchronize the snapshot 424 or 426 to the mirror tree data structure 404. In this manner, minimal data rewrite occurs in making the snapshot (e.g., unchanged data from a previous snapshot is not rewritten), which also helps speed up operation of the parser 422.

The output of the parser engines 406 and 408 may be modified or revised data structures. For example, if the layout analysis engine 406 is like that illustrated in FIG. 5, the output of layout analysis engine 406 may be a data structure that includes individual ink strokes grouped into associated words, lines, paragraphs, and the like. Operation of a layout analysis engine of this type is described in more detail below. Similarly, if the parser engine 408 is a handwriting recognition system 310, the output may include information or a data structure that ties the ink strokes to machine-generated text.

When the parser engines 406 and 408 complete their operations on the snapshot input data 424 and 426, respectively, the resulting information may be sent back to the application program 420, as indicated by arrows 428 and 430, respectively. As noted above, however, the user 400 may change the document tree data structure 402 during the time period that the parser engines 406 and 408 operate on the snapshots 424 and 426. Therefore, before writing the parser analysis engine results back to the document tree data structure 402, the parser 422 compares the document tree data structure 402 currently in the application program 420 (including the user's changes) to the revised document tree data structure(s) sent by the parser engines 406 and 408, optionally using the mirror tree data structure 404. If the user 400 made changes to the document tree data structure 402 that are not contained in the revised document tree data structure(s) from the parser engines 406 and 408 (e.g., by adding, deleting, moving, resizing, or otherwise modifying one or more strokes), or if user-made changes to the document tree data structure 402 render moot or conflict with changes to the data structure(s) made by the parser engines 406 and 408 (e.g., by adding, deleting, or otherwise modifying strokes), then the application document tree data structure 402 is revised only to include the changes made by the parser analysis engines that do not conflict with the user-made changes (user-made changes will override parser-made changes). Also, only portions of the document tree data structure 402 modified from the existing version are changed or rewritten, in order to reduce data writing time (and the associated interruption experienced by the user 400). In this manner, the finally revised document tree data structure 402 present in the application program 420 will include all changes made by the user 400 and the results of the previous parser engine analyses, to the extent that the parser engine made changes that are not inconsistent with or trumped by user-made changes.

Because the document tree data structure 402 contains shared data ultimately modifiable by the user 400 as well as the parser engines 406 and 408, the user 400 cannot input new data into the document tree data structure 402 while it is being rewritten to include the parser-made changes. If a user 400 attempts to do so, systems and methods according to the invention can handle these efforts in any suitable manner. For example, the new strokes or changes may be ignored, or they may be stored in a temporary buffer memory until the revised application document tree data structure 402 is available for data input. However, because the document tree data structure 402 in the application program 420 according to this example of the invention generally is unavailable only during the time the system rewrites the changed portions of the data structure 402, the unavailable time period typically is quite short, and often unnoticed by the user.

Once the document tree data structure 402 is rewritten or modified (including the user and/or parser engine made changes), the mirror tree data structure 404 is updated to mirror the rewritten or modified document tree data structure 402, and the parser engines 406 and 408 can repeat their analyses (if necessary). Advantageously, in some examples, the parser engines 406 and 408 will operate only on the portions of the document tree data structure that have been recently modified (and any portions affected by the recent modifications), to reduce processing time. By incrementally updating the parser engine operations at the same time the user inputs data, the parser 422 can generally keep up with the user's data entry, thereby minimizing processing delays observed by the user.

As mentioned above, in some examples of the invention, processing time may be reduced by limiting processing to portions of the data structure where changes have occurred (and all areas affected by these changes). If user input or previous parser engine operations have not affected some portions of a data structure, there may be no need for the parser engine(s) to again analyze these same portions (and presumably arrive at the same results). As examples, systems and methods according to some examples may reanalyze any portion of the data structure located within a predetermined distance of a change. For example, reanalysis may include the line of any change and any one or two lines surrounding the change, any strokes located within a circle of a pre-selected radius surrounding the change, any block of text (as described in more detail below) including a change, or the like. The following explains examples of parsers that take advantage of these features in more detail.

C. An Example of Processing Taking Place During Parsing

The data analyzed or processed in systems and methods according to examples of the present invention can take on any suitable form or structure. For example, in one procedure as illustrated in FIG. 3, individual strokes 300 of input ink data are combined together into a data structure as a result of a succession of decisions made by a layout analysis engine 302, which groups or associates certain individual strokes based on overall ink layout and statistics obtained from the input ink. The layout analysis engine 302 may provide a hierarchical grouping of ink strokes on a page, which allows global statistic calculations over the group(s). The first stroke grouping decisions are conservative, based on local layout relationships when the groups of ink strokes are small (e.g., small groups representing individual ink strokes or relatively short combinations of strokes). Later stroke grouping decisions can be more aggressive, due to the larger statistic sample size collected from the larger ink stroke groupings (e.g., stroke sizes over a longer line, relative stroke spacing, line angles, etc.). Multiple passes through the input ink data may be conducted to enable increasingly aggressive decision making in determining whether to merge strokes to form stroke sets, such as words, lines, and/or blocks 304 of input ink strokes.

Figure 5:
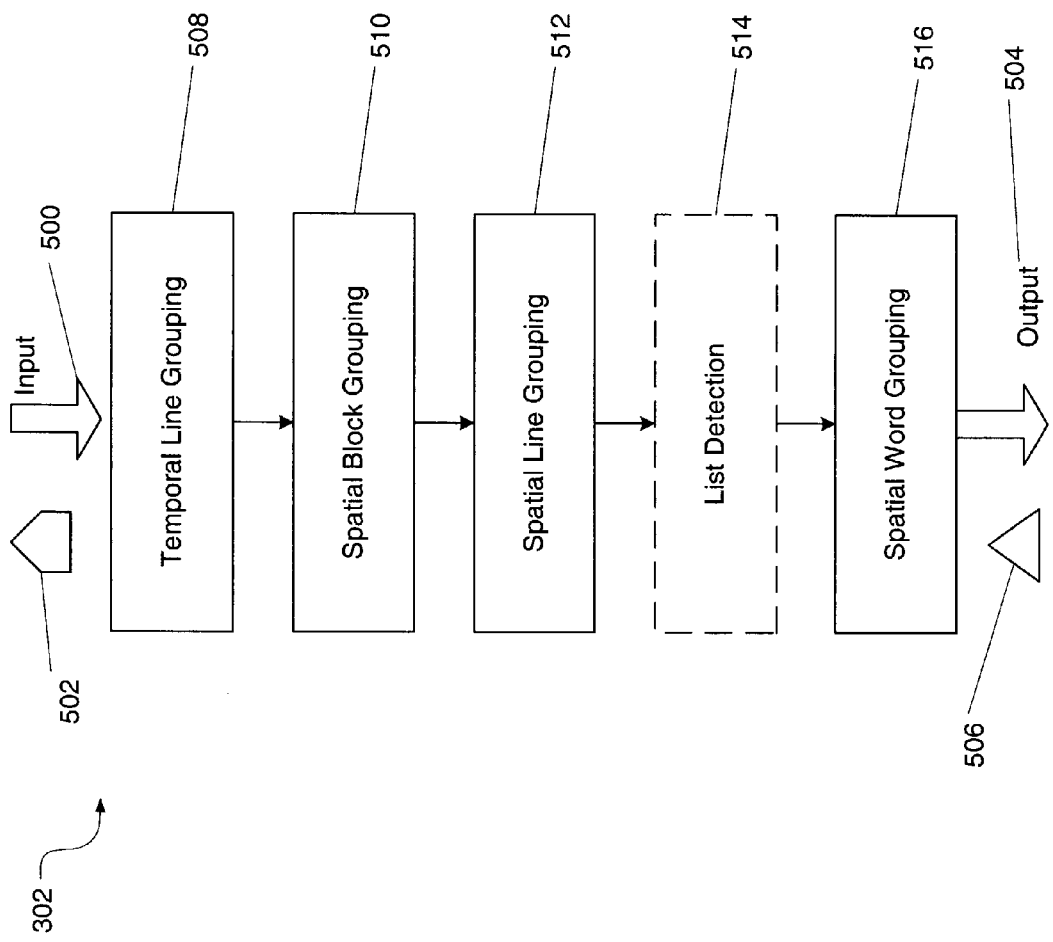
FIG. 5 illustrates an example of various layout analysis steps that may be used in conjunction with examples of this invention.

FIG. 5 generally illustrates steps or parse engines involved in one example of an ink layout analysis parser engine, system, or method 302 useful in producing and/or modifying data structures used in some examples of this invention. Because of the very high degree of freedom provided to users in inputting digital ink into systems and methods according to some examples of the invention (e.g., a user is allowed to write anywhere on a digitizer input screen, in any orientation, at any time, using any desired stroke size), when the layout analysis procedure 302 of FIG. 5 begins, there may be no preliminary information available from which to determine the proper layout, orientation, or type of input data (e.g., whether the incoming input data 500 is textual, drawing, mathematic, music, flow diagrams, charts, graphs, etc.). Element 502 in FIG. 5 provides a general graphical representation of one of the types of possible input data structures 500 at the start of this layout analysis procedure. The graphical representation 502 is illustrated in more detail in the parse tree data structure of FIG. 6A. In general, when the layout analysis procedure 302 begins (e.g., even as the user may continue to input ink strokes into the pen-based computing system), the system treats every stroke S 600 on a given page (or in a given document) P 608 as a separate word W 602, every word W 602 is treated as a separate line L 604, and every line L 604 is treated as a separate block B 606 (or paragraph). The layout analysis engine 302 performs the task of associating or merging strokes together to form stroke sets containing proper words, lines, and blocks of associated ink data. While any suitable layout analysis engine could be used in conjunction with this invention, the example illustrated in FIG. 5 is described in more detail below.

While this description of the exemplified layout analysis engine 302 uses terms like "word," "line," and "block," these terms are used in this portion of the specification as a matter of convenience to refer to one or more associated strokes or stroke sets. At the time the layout analysis 302 initially occurs in at least some examples of the invention, no final determination has been made as to whether individual strokes or stroke sets constitute writing, drawings, music, etc. Also, while the above description uses the term "page," it is not necessary that a given electronic document be parsed on a page-by-page basis. For example, "blocks" or "paragraphs" of electronic documents could bridge two or more pages of a document without departing from the invention.

The layout analysis engine 302 according to this example of the invention operates greedily, such that during each pass (or operation of each parse engine), stroke or line merger operations occur, but splits do not. Moreover, the engine 302 may be operated with appropriate tests and tolerances such that it should not be necessary to go back and correct an undesired merger operation.

Figure 6B:
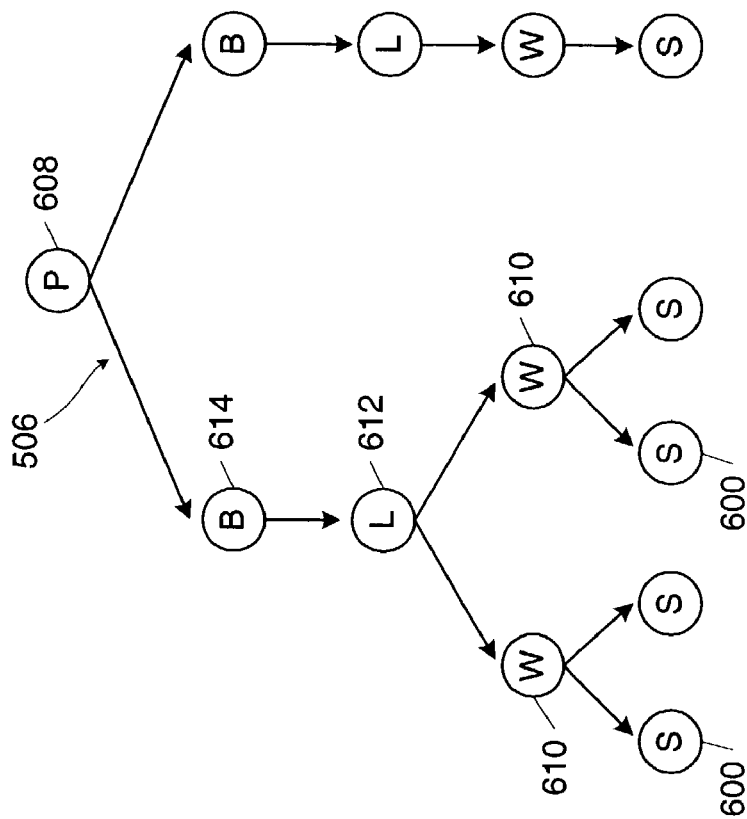
FIGS. 6A and 6B illustrate examples of parse tree data structures that may be obtained, for example, using a layout analysis engine that performs the steps illustrated in FIG. 5.
Figure 6A:
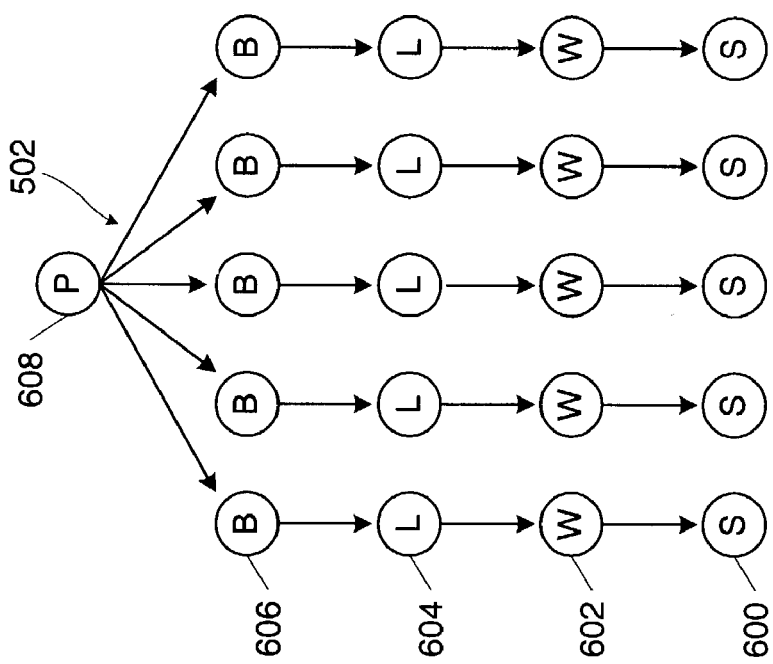

As a result of the operation of layout analysis engine 302, the individual strokes 600 of an electronic document may be combined together into associated stroke sets including words W, lines L, and blocks B (or paragraphs), where appropriate. FIG. 6B illustrates a graphical representation 506 of a possible data structure for the data output 504 from a layout analysis engine 302. As evident from a comparison of FIGS. 6A and 6B, the Page (or document) 608 overall contains the same stroke information, but certain strokes S 600 have been combined or associated together to form words W 610, and certain words W 610 have been joined together to form a line L 612 in the data structure of FIG. 6B. Of course, a word W 610 may contain any number of strokes S 600, and likewise a line L 612 may contain any number of words W 610. Also, although not illustrated in the particular parse tree example of FIG. 6B, two or more lines L 612 also may be joined together to form a block B 614 (or paragraph).

In addition to helping define the structure of ink in a document, the various nodes in the parse tree (e.g., nodes 600, 610, 612, etc. in FIG. 6B) may be used to store spatial information relating to various levels in the tree. For example, each line level node 612 may store a regression/fit line of all points that make up the strokes of the line, the convex hull of each stroke in the line, and/or any other desired information. Also, the parse tree data structures can be modified by applying various elementary operations on the strokes, words, lines, and blocks contained in it. Suitable operations may include: add, remove, merge, split, and re-parent. More complex operations may be composed using these elementary operations. As these operations are performed on the data structure tree, the statistics maintained at the different node levels may be automatically updated to correspond to the new structure.

FIG. 5 provides a schematic overview of one example of a suitable layout analysis engine 302 useful in some examples of this present invention. In this example, a first step in the layout analysis procedure 302 is a temporal line-grouping step 508, which generally compares features of temporally adjacent strokes (i.e., consecutively written strokes) and combines them as "lines," if appropriate. Various factors may be taken into account in determining whether a temporal line grouping should be made from two or more temporally adjacent strokes, such as stroke size, inter-stroke spacing, stroke angle, etc. Once this temporal line grouping step 508 is completed, the next step in the analysis 302, a spatial block grouping step 510, compares the physically adjacent temporal line groupings formed in step 508 and combines the temporal line groupings that are located close to one another as spatial blocks. Various factors may be taken into account in determining whether a spatial block grouping should be made from adjacent temporal line groupings, such as stroke size, inter-stroke spacing, line angle, etc.

The temporally grouped lines (from step 508) may be further grouped if appropriate, optionally taking into consideration their spatial block relationship or orientation, in a spatial line grouping step 512. This spatial line grouping step 512 need not consider the time of one stroke compared to another stroke, although factors in addition to the lines' spatial relationship may be taken into consideration, such as line angle, stroke size, etc. Also, the results of the spatial block grouping procedure 510 described above may be used as a factor in determining whether a spatial line grouping should be made between two existing temporal line groupings.

Once the spatial line groupings have been completed, the layout analysis procedure 302 according to this example may then combine the individual strokes in the line groupings into one or more spatial word groupings 516, depending, for example, on factors such as inter-stroke spacing, line orientation, stroke size, etc. The resulting output 504 may be a data structure 506 with strokes grouped into words, lines, and blocks, as explained in conjunction with FIG. 6B.

FIG. 5 also illustrates an optional parse engine or step in broken lines that may be utilized as part of a layout analysis 302. This optional step is called "list detection" 514. Often, when people write a list, they tend to write a (vertical) column of numbers, letters, or bullet points, and then fill in the list elements (in the horizontal direction). At other times, people will write out the content of the list, and then later add a vertical column of numbers, letters, or bullet points. The list detection engine 514 may detect these special circumstances (e.g., by looking at the orientation and timing of temporal line groupings, etc.) and combines the list number, letter, or bullet point strokes with the corresponding list element text.

The various steps in this exemplified ink analysis engine 302 (FIG. 5) may be changed in order or omitted without departing from the invention. For example, if desired, the spatial line-grouping step 512 may take place before the spatial block-grouping step 510.

The output data 504 from the layout analysis engine 302 can be used in any suitable manner, such as in a classification engine 306, as illustrated in FIG. 3, and from there the data may proceed to other appropriate processing engines (e.g., annotation recognition 314, handwriting recognition 310, etc.). Layout analysis engine 302, or a combination of layout analysis engine 302 and classification engine 306, may form a parser engine 406 as illustrated in conjunction with FIG. 4.

Of course, the present invention is not limited to operation with a layout analysis engine or any specific type of analysis engine. Other suitable engines or procedures for grouping or associating individual strokes into appropriate data structures or any other desired analysis can be performed without departing from this invention. Also, if desired, prior to processing, the user could indicate to the system that certain strokes always should be grouped together (e.g., by drawing a line or lasso around, highlighting, or otherwise selecting input data strokes to be associated together).

IV. An Ink Divider Object and API

A. General Description

This specification continues with a detailed description of examples of parsers and application programming interfaces according to the invention, including a specific example, namely the InkDivider object. One function of the systems and methods according to the invention (e.g., the InkDivider object) is to take a collection of ink strokes provided by an application and divide these strokes into parsed entities of specified granularity (e.g., into words, lines, sentences, paragraphs, drawings, or the like). Without proper parsing, electronic ink either tends to become far too granular (i.e., having large numbers of ungrouped strokes), or it tends to become grouped together as a single ink object, making desired moving, selecting, scaling, and other operations, particularly of individual ink strokes or small groups of ink strokes, difficult or impossible. The systems and methods according to the invention, including, for example, an ink divider object and API, exposes the parsing technology and results to the developer community, which thereby allows code writers to take advantage of and use the parsing engine results when writing code for new applications.

In general, during an inking session, in some manner, ink strokes will be added to and/or deleted from a collection of ink strokes present in the application. Additionally, during an inking session, existing strokes within the ink stroke collection may be moved, resized, partially erased, and/or otherwise modified.

When an inking session ends (and optionally incrementally while an inking session is taking place), the operating application program will call the parser (e.g., included in the InkDivider object), which processes the strokes into stroke sets or groups of different granularity (at least the new strokes and/or changed strokes and/or any strokes affected by the new and/or changed strokes since a previous call of the parser). In general, when the parser is called, the application program supplies ink strokes to the parser and receives back certain information. In some examples, the information returned contains a back-pointer that identifies the original strokes that were divided. Systems and methods according to some examples of the invention also may provide a method (called "ResultByType" in this example) for retrieving a desired collection of strokes of specified granularity. For example, the application program can query the division results to obtain units of different parsing granularity, depending on the desired granularity type (e.g., words, lines, blocks, drawings, etc.). The parsing results also may have a notion of baseline for the purpose of correcting angled writing to a horizontal baseline before feeding this data to a handwriting recognizer, if necessary and/or desired. This may be accomplished, for example, by making the rotation matrix available to code writers.

Notably, individual ink strokes may belong to multiple ink stroke collections or different granularity groupings, e.g., a stroke can be part of a Word and part of a Paragraph.

With this general background and overview in mind, the various features of an ink divider object and API examples according to the invention are discussed in more detail below. While much of the following discussion relates to a specific ink divider object and its associated objects, properties, etc., those skilled in the art will recognize that various modifications can be made to the specific implementations described below without departing from the invention.

B. Ink Divider Object

Figure 7:
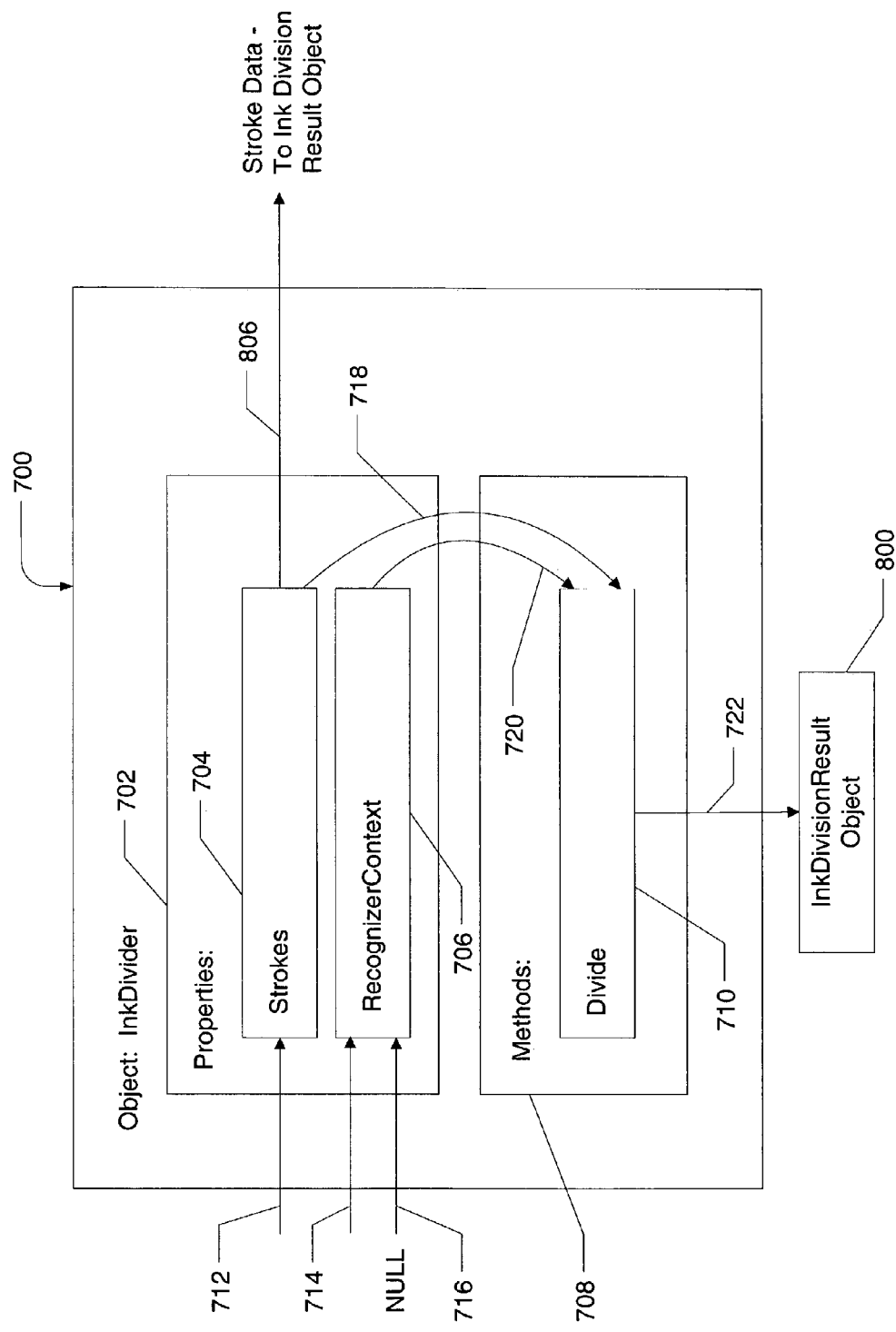
FIG. 7 illustrates components and features of an InkDivider object used in some examples of the present invention.

FIG. 7 generally illustrates the content of an example InkDivider object 700 useful in some examples of the invention. In this example, the InkDivider object 700 contains two properties 702, namely a Strokes property 704 and a RecognizerContext property 706. This illustrated InkDivider object 700 also includes one method 708, namely a Divide method 710.

The Strokes property 704 returns and/or sets the collection of ink strokes to be subjected to the Divide method 710. The strokes generally are sent to the Strokes property 704 by the application program being used, which determines which strokes to add to and/or remove from and/or otherwise modify in the collection of strokes in the Strokes property 704. This generally is shown in FIG. 7 by arrow 712, which represents incoming strokes sent by the application program (or otherwise sent to the Strokes property 704 in any suitable and/or desired manner). Strokes also may be added to and/or removed from the Strokes property 704 by the ultimate user in any suitable manner, such as through an ink insertion action, an ink paste action, an ink cut or delete action, etc. If desired, the stroke information sent to the Strokes property 704 need not include all features or properties of the ink strokes, such as color. Rather, if desired, it is sufficient to send only the features or properties of the ink strokes relevant to parsing.

The input and output data for the Strokes property 704 may take on the following form:

[propputref]HRESULT Strokes([in]InkStrokes* Strokes);
[propget]HRESULT Strokes([out,retval]InkStrokes** Strokes).

The RecognizerContext property 706 returns and/or sets the recognizer to be used and/or associated with the InkDivider object 700. This property 706 is useful in at least some examples of the invention because the desired parsing operation may include handwritten text recognition to be based on a language different from the default language of the system on which the software or application program is being run. For example, a pen-based computing system may have English as the default language for its operating system and/or keyboard. If the computer user is bilingual or if another user uses the computer, however, in some instances, the user may write or take notes in a language other than English. If a default English language handwriting recognizer is the only option available on the system, this may result in errors as the recognizer attempts to recognize the non-English handwritten text. Other specialized recognizers also could be set by application code, for example, specialized recognizers for recognizing musical notations, mathematical formulas and symbols, drawing features, etc. By enabling code writers to set and/or use different handwriting recognizers (including recognizers for different languages), the resulting handwriting recognition results may be improved. The ability for code writers to set a desired handwriting recognizer is illustrated in FIG. 7 by arrow 714.

In some examples of the invention, the RecognizerContext property 706 may default to a "null" value, which, in these examples, means that the operating system default language of the computer will be used as the handwriting recognition language and/or a recognizer supplied with the operating system will be used as the recognizer unless and until the RecognizerContext property 706 is changed to specify another recognizer. The default or "null" language value may correspond to the "keyboard" default locale ID set during initial system set up. This default or null input feature is illustrated in FIG. 7 by arrow 716, labeled "NULL."

The input and output data for the RecognizerContext property 706 may take the following forms:

[propputref]Recognizer([in]InkRecognizer* Recognizer);
[propget]Recognizer([out,reval]InkRecognizer** Recognizer).

In operation, in at least some examples of the invention, a parser will make a first pass at determining word breaks in the handwritten text based on spatial and temporal metadata associated with the ink strokes. This may include, for example, the temporal line grouping, spatial block grouping, and spatial line grouping steps generally described above in conjunction with FIG. 5. These parsing operations can be conducted relatively quickly, but generally the results will not include the sophistication and accuracy associated with a handwriting recognizer and its associated language model. Therefore, in at least some examples of the invention, a handwriting recognizer is used to make a second pass at each handwritten "line" of text and accurately identify breaks between the words, using the dictionary associated with the handwriting recognizer to better identify word breaks. The recognizer also can convert the handwritten text into machine-generated text (e.g., into a format suitable for a word processing program, email, electronic calendars and appointment books, etc.).

FIG. 7 also illustrates a Divide method 710, which constitutes part of the InkDivider object 700 in this example. This method 710 divides or parses the associated strokes (obtained from the Strokes property 704—see arrow 718) using the recognizer set by the RecognizerContext property 706 (see arrow 720). The Divide method 710 produces and returns an InkDivisionResult object 800 that contains the results of the ink division (or parsing). The generation and return of the InkDivisionResult object 800 is illustrated in FIG. 7 by arrow 722. An example of the available output data format of the Divide method 710 is shown below:

HRESULT Divide ([out, retval] InkDivisionResult** divisionResults).

In at least some examples of the invention, the Divide method 710 is performed or called synchronously, while additional ink may be added to, deleted from, or otherwise modified in the document in the application program. In additional examples of systems and methods according to the invention, the Divide method 710 may operate in a background thread on the strokes provided via the Strokes property 704, and it does not return an InkDivisionResult 800 until the entire parsing operation is completed. By operating in a background thread and without affecting further stroke entry or modification, in many instances the use of Divide method 710 will be transparent or almost transparent to the pen-based computing system user and will not cause significant processing delay.

Each time the Divide method 710 is called, a new InkDivisionResult object 800 may be created, which effectively captures a snapshot of the ink parse tree data structure (see FIG. 6B) at the time the Divide method 710 is called. In at least some examples of the invention, it is the responsibility of the application program to compare the Strokes of each InkDivisionResult object 800 (discussed in more detail below) to determine whether the parsing results have changed between different calls of the Divide method 710.

Of course, without departing from the invention, an ink divider object may include methods, properties, and/or other elements in addition to and/or in place of and/or in combination with the specific methods and properties illustrated in FIG. 7. As one example, an ink divider object additionally may include a "Line Height" property (alternatively, the Line Height property could be associated with another object or provided in any suitable manner). The Line Height property allows a code writer, as input, to set an expected Line Height for lines of text. In this manner, during parsing, the layout analysis system and/or classification analysis system (or other systems in the parser) can use this expected line height information and do a better job in differentiating between lines of text and drawings or diagrams. By giving the parser this line height guideline, it can more effectively and efficiently differentiate multiple lines (e.g., in a paragraph orientation) or single lines from drawings (e.g., drawing lines are typically taller than a single line of handwriting).

While no limit on the expected line height size of handwritten lines is necessary, in some examples of the invention, the systems and methods will accept expected line heights that fall within a certain range. Of course, this range of expected line heights may vary widely. In some examples of the invention, the expected line height must fall within a minimum height of 100 digitizer pixels and a maximum height of 50,000 digitizer pixels, with a default height of 1200 pixels. If a code writer attempts to set an expected line height outside of these ranges, the Line Height property may return an error message. Alternatively, the Line Height Property may automatically change the input line height to the relevant minimum or maximum height value without returning an error message (e.g., automatically setting a line height value of 50,000 if an application program code attempts to set the value at 50,003). As another alternative, attempted setting a line height value outside the valid range may result in the value simply being ignored (and reverting back to the previous line height value or the default value).

As output, the Line Height property will tell the application program the previously set value for the Line Height property, or it will return the default value if no previous value had been set.

As an example, the input and output data for the Line Height property according to this example of the invention may take on the following forms:

HRESULT [propput] LineHeight([in]Long LineHeight);
HRESULT [propget] LineHeight([out, retval]Long* LineHeight).

C. Ink Division Result Object

Figure 8:
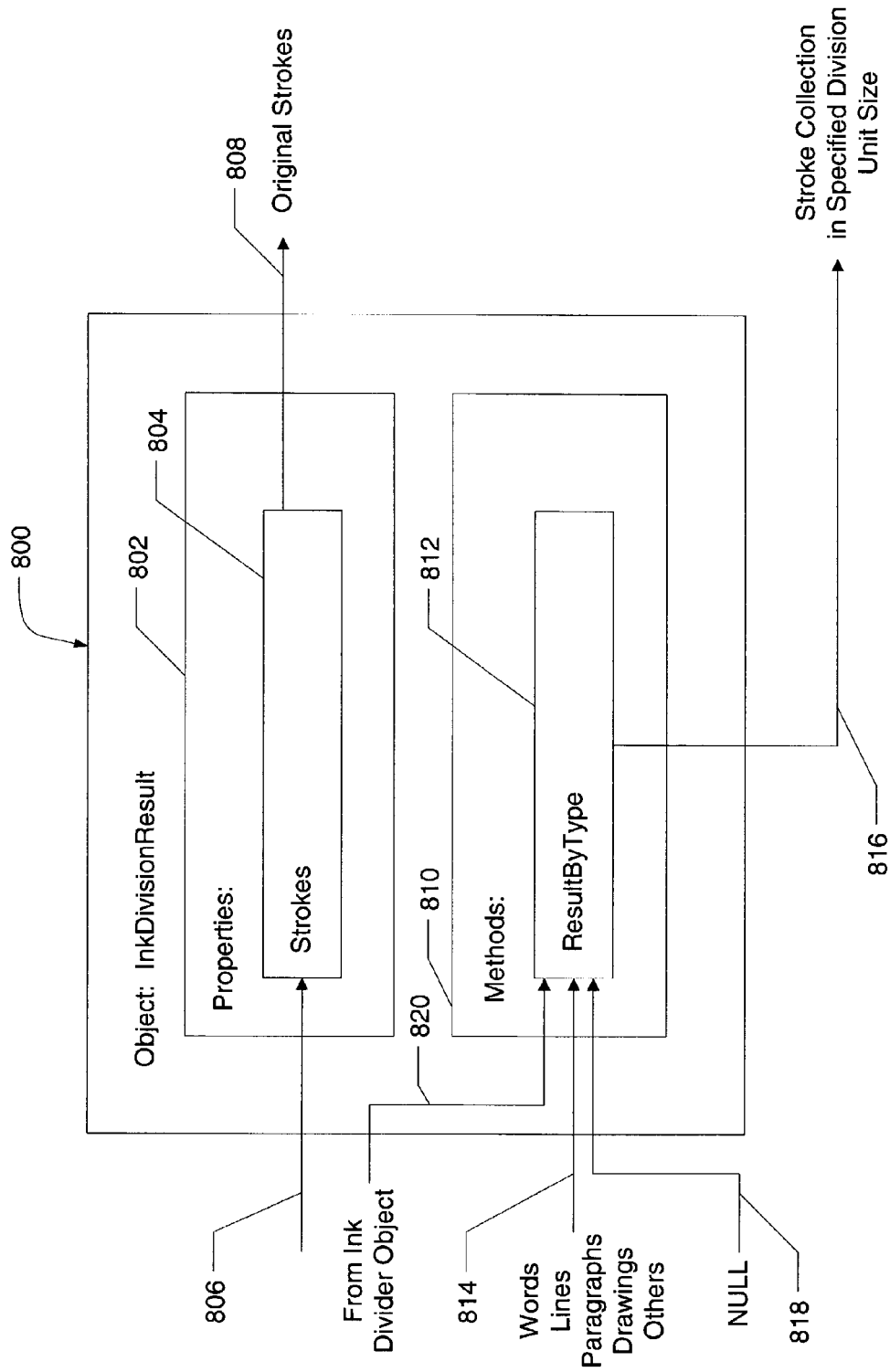
FIG. 8 illustrates components and features of an InkDivisionResult object used in some examples of the present invention.

FIG. 8 graphically illustrates an InkDivisionResult object 800 according to some examples of the invention. As noted above, the Divide method 710 of the InkDivider object 700 parses the stroke collection (obtained from Strokes property 704) based on the selected RecognizerContext property 706 and creates an InkDivisionResult object 800. The InkDivisionResult object 800 captures the data structure resulting from the division and/or parsing operations, which may be considered to be a "parse tree" of the form illustrated in FIG. 6B, in at least some examples of the invention. The resulting data structure present in the InkDivisionResult object 800 can be further used, e.g., in subsequent ResultByType operations (described in more detail below), to retrieve ink data sets of different levels of granularity for a given stroke collection.

As illustrated in FIG. 8, this example of the InkDivisionResult object 800 has a property 802 called "Strokes" 804. This Strokes property 804, when called, returns a reference to the strokes that were originally used in producing the InkDivisionResult 800. The InkDivider object 700 internally builds a data structure that corresponds to a specific set of strokes at an instant in time. The Ink object containing these strokes, however, is not static. Rather, new strokes can be added (either individually or in bulk, e.g., through a paste operation) and existing strokes can be deleted or moved or otherwise modified at any time (even while a parsing operation is being carried out). Therefore, the Strokes property 804 in the InkDivisionResult object 800 provides application program code or client code a means of determining: (a) which strokes were subject to division to create a particular InkDivisionResult object 800 and (b) whether those strokes have been affected or modified since the last InkDivisionResult object was obtained (e.g., since the last Divide method 710 call). This Strokes property 804 also allows the application code or client code to compare two InkDivisionResult objects to determine whether the parse tree has changed from one Divide method call to the next.

The Strokes property 804 of the InkDivisionResult object 800 receives, contains, and/or maintains a list of strokes used in producing the InkDivisionResult object 800. This is illustrated in FIG. 8 by input arrow 806. This input stroke data can be obtained or introduced, for example, from the Strokes property 704 of the InkDivider object 700, or from any other suitable source. The ability to output data representing the ink strokes used in obtaining the InkDivisionResult object 800 is illustrated in FIG. 8 as arrow 808 from the Strokes property 804. The output data 808 of the Strokes property 804 may take the following form:

[propget]HRESULT Strokes([out,retval]InkStrokes** Strokes).

Because the InkDivider object 700 encapsulates the parsing engine and the InkDivisionResult object 800 encapsulates the parsing tree data structure for a specific ink division operation, it is possible to release the InkDivider object 700 (e.g., for further operations) while one or more InkDivisionResult objects 800 continue to exist.

As an alternative, rather than include a Strokes property 804 in the InkDivisionResult object 800, client code or application program code could cache the stroke information externally. However, with the likely creation of multiple InkDivisionResult objects 800 over the course of an inking session, it may be difficult and computationally expensive to manage the pairs of InkDivisionResult objects 800 and the external ink stroke data sets. Therefore, providing the Strokes property 804 as part of the InkDivisionResult object 800 reduces overhead for the client code or application code and aids in effectively utilizing the ink divider API.

The InkDivisionResult object 800 according to this example further includes a method 810 called ResultByType 812, as further illustrated in FIG. 8. This ResultByType method 812, when called, returns the collection of strokes collections (in division Units) that resulted from a given DivisionType (the type of division, e.g., words, lines, paragraphs, drawings, etc.). As examples, this method 812 returns the input strokes grouped as words, lines, paragraphs, drawings, etc., depending on whether the client code or application code requested words, lines, paragraphs, drawings, etc. This method 812 can be called multiple times, if desired, to retrieve division results for various different parsing granularities. For example, one call could provide the words in the parsed stroke collection, another call could provide the lines, another the paragraphs, etc.

Input to the ResultByType method 812 includes at least the InkDivisionType desired, which, as noted above, in some examples may mean words, lines, paragraphs, drawings, etc. This input is illustrated in FIG. 8 by input arrow 814. The output, which includes the collection of stroke collections for the given DivisionType (e.g., an InkDivisionUnits object), is represented in FIG. 8 by output arrow 816. This data may take the following format:

HRESULT ResultByType ([in] InkDivisionType divisionType, [out, retval] InkDivisionUnits* division Units).

In some examples of the invention, if no DivisionType is specified (DivisionType=NULL), as represented in FIG. 8 by arrow 818, then the returned InkDivisionUnits object collection, in at least some examples of the invention, may include all of the granularities identified by the parser. Because some granularities subsume other granularities (e.g., a Line may contain several Words), the resulting collection may contain overlapping division units. Of course, any suitable default granularity (or even no default granularity) can readily be used without departing from the invention. For example, in some versions, the default DivisionType may be "WORD" unless and until another granularity is specified by the user code or application code.

As illustrated in FIG. 8, the ResultByType method 812 may receive the input data structure from the Divide method 710 of the InkDivider object 700, as illustrated by arrow 820.

Of course, without departing from the invention, an InkDivisionResult object 800 may include methods, properties, and/or other elements in addition to and/or in place of and/or in combination with the specific methods and properties illustrated in FIG. 8.

D. Ink Division Units Object

Figure 9:
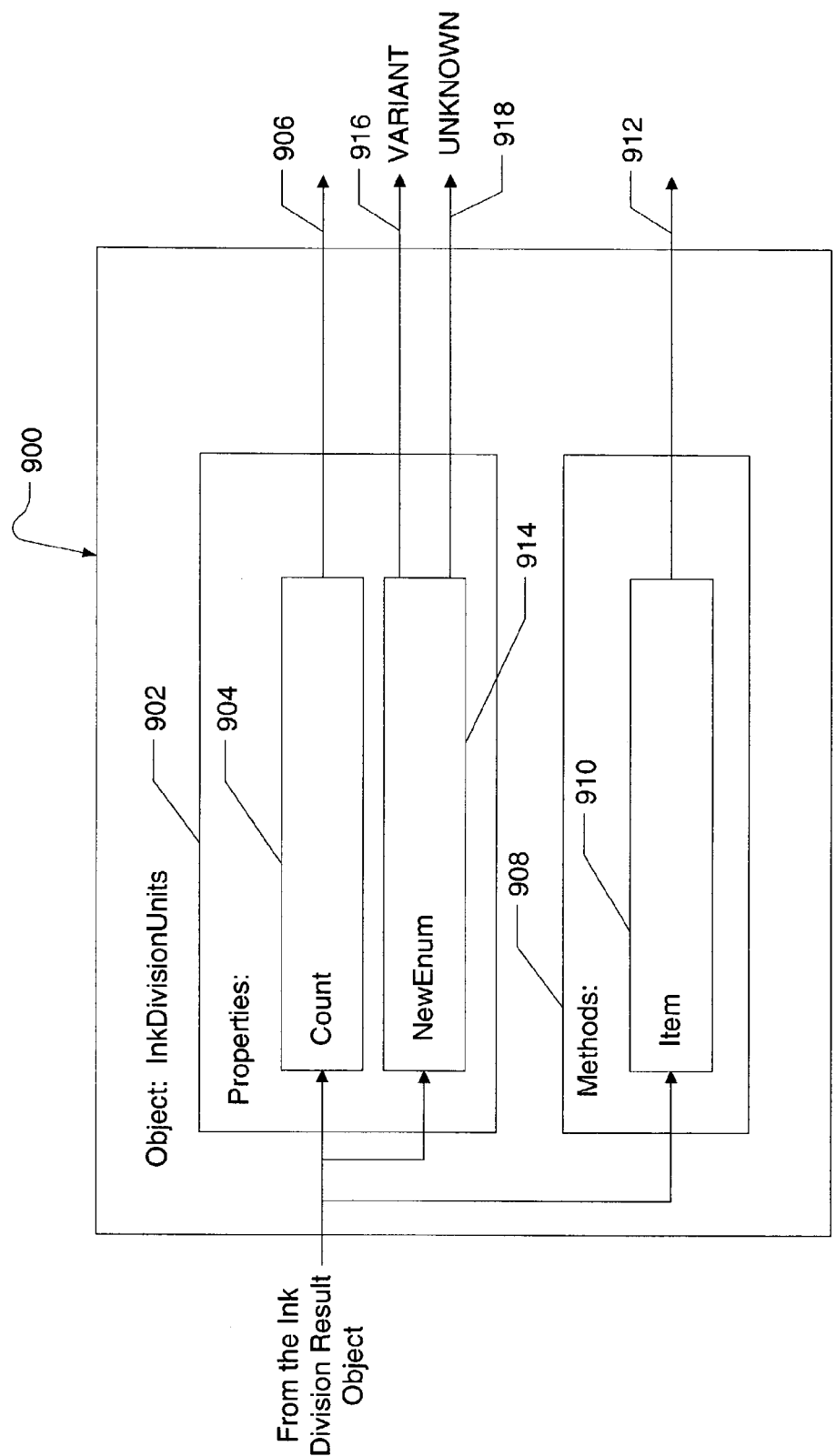
FIG. 9 illustrates components and features of an InkDivisionUnits object used in some examples of the present invention.

FIG. 9 illustrates an InkDivisionUnits object 900 useful in some examples of this invention. This object 900 is a collection wrapper for the results of the parsing operation. The collection, in at least some examples of this invention, typically is expected to comprise effectively all of the strokes originally given to the InkDivider object 700. For example, a collection of strokes that has been divided into Words may be represented by an InkDivisionUnits object 900 collection that contains a single InkDivisionUnit object 1000 for each word (see also FIG. 10, described in more detail below). The strokes that result from expanding the individual InkDivisionUnit objects 1000 into their respective strokes would be expected to match the original set of strokes passed to the InkDivider object 700.

As illustrated in FIG. 9, the InkDivisionUnits object 900 of this example contains a property 902 called Count 904. The Count property 904 provides the count (or number) of division units present in a given stroke collection and makes this information available to the API for use in application code or client code. For example, the Count property 904 may be able to inform an application program that a given stroke collection contains x number of words and/or y number of lines and/or z number of paragraphs. This data can be determined in any suitable manner, for example, by looking at the parse tree data structure of FIG. 6B for a given stroke collection, which exists in the InkDivisionResult object 800. The output of the Count property 904 is illustrated in FIG. 9 by arrow 906. The output data may be structured as follows:

[propget] HRESULT Count([out,retval]Long** Count).

The InkDivisionUnits object 900 of this example further includes a method 908 called Item 910. The Item method 910, when called, returns a specific InkDivisionUnit object 1000 in the collection of strokes given the unit's Index value in the collection (e.g., "return the fourth word"). The output is represented in FIG. 9 by arrow 912. The output data of the Item method 910 may be structured as follows:

HRESULT Item ([in] Long index, [out,retval] InkDivisionUnit* division Unit).

Another property 902 contained in the InkDivisionUnits object 900 of this example is called "_NewEnum" 914. This property 914 returns either the IEnum VARIANT or IEnum UNKNOWN enumerator interface for the stroke collection being evaluated. This property 914 may be used to retrieve any individual object in the ink stroke collection being evaluated, as illustrated in FIG. 9 by output arrows 916 and 918, respectively. The data evaluated by the _NewEnum method 914 may take on the following format:

[propget] HRESULT _NewEnum ([out, retval]IUnknown** _NewEnum).

Notably, in this example of the invention, (a) the Count property 904 plus the Item method 910 and (b) the _NewEnum property 914 described above are effectively two equivalent ways of accessing the elements of the ink stroke collection, depending on the programming language and coding style used by the client or application program code. The combination of Item method 910 and Count property 904 could be used in a traditional "for" loop, while the _NewEnum property 914 could be utilized by the "for each" construct available in some programming languages.

Of course, without departing from the invention, an InkDivisionUnits object 900 may contain properties, methods, and/or other elements in addition to and/or in place of and/or in combination with the specific properties and methods described above in conjunction with FIG. 9.

E. Ink Division Unit Object

Figure 10:
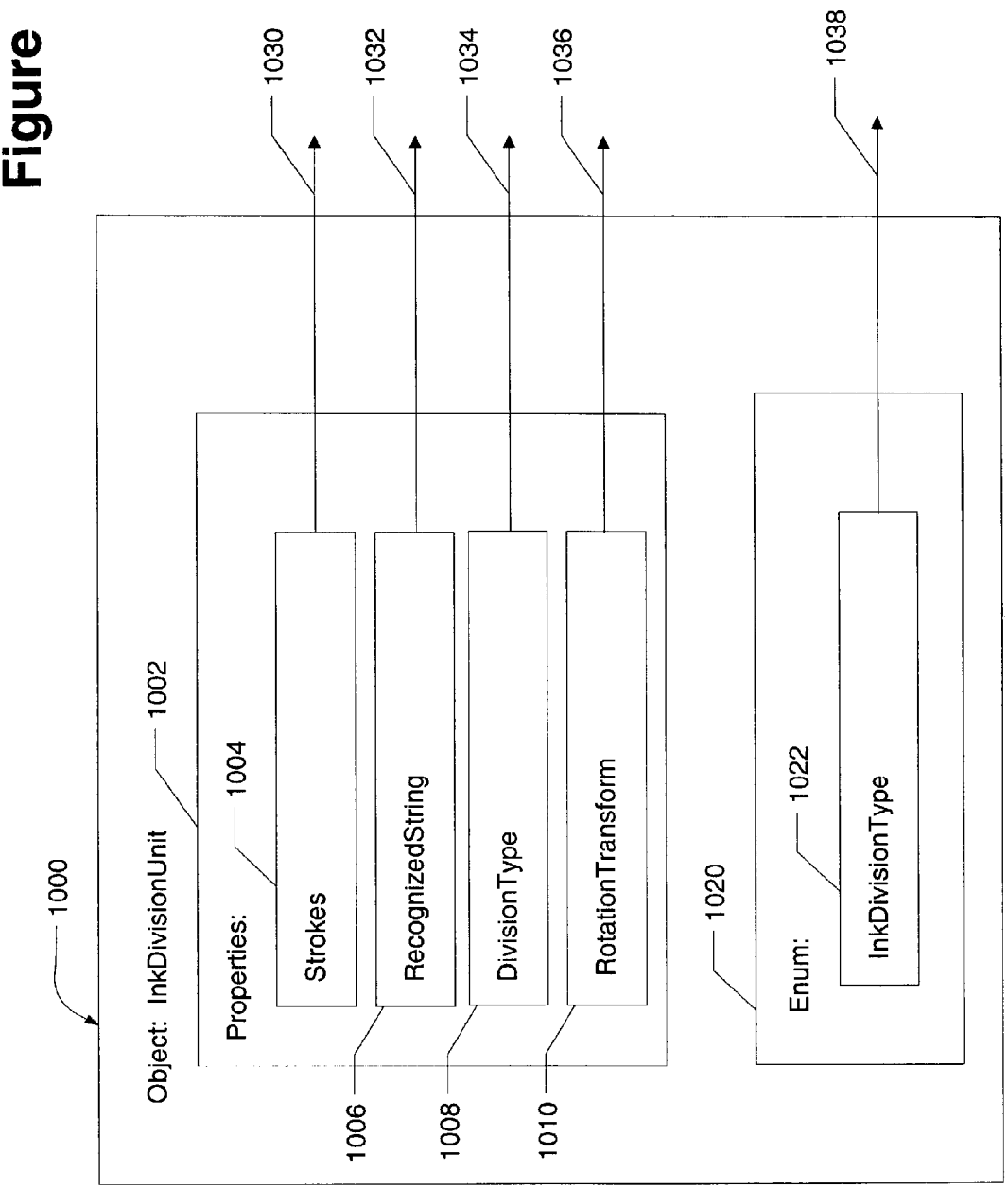
FIG. 10 illustrates components and features of an InkDivisionUnit object used in some examples of the present invention.

Another object in the API according to some examples of the invention, as illustrated in FIG. 10, is called the "InkDivisionUnit" object 1000. This object 1000 represents an individual element of the ink stroke collection resulting from the parsing operation for the granularity specified by an InkDivisionResult.ResultByType operation. For example, the InkDivisionUnit object 1000 may include an individual word of a parsed ink stroke collection, when the specified parsing granularity (or division type) was "word."

The first property 1002 in this example object 1000 is a Strokes property 1004. The Strokes property 1004 includes the strokes contained in the unit that resulted from the ink division (e.g., the strokes in the word or line or paragraph, depending on the selected granularity). This property 1004 gives code writers ready access to the strokes that make up each granular result of a parsing operation. The data output by or accessible through this Strokes property 1004 (as indicated by output arrow 1030) may be in the following format:

[propget]HRESULT Strokes([out,retval]InkStrokes** Strokes)

The property RecognizedString 1006 also is contained in this example of the InkDivisionUnit object 1000, as illustrated in FIG. 10. The output of this property 1006, which is illustrated in FIG. 10 by arrow 1032, is the machine-generated text resulting from the handwriting recognition operation (and/or a pointer to a memory location of the data for this recognized text). This example of the InkDivisionUnit object 1000 further includes a property called DivisionType 1008, as illustrated in FIG. 10. This property 1008 returns the type of division unit in the object 1000 (e.g., word, line, sentence, paragraph, drawing, etc.), as illustrated in FIG. 10 by output arrow 1034. The data for the DivisionType property 1008 output may be in the following format:

[propget]HRESULT divisionType([out,retval]InkDivisionType** division Type)

In some examples and/or uses of the invention, this DivisionType property 1008 may be useful in the event that a given InkDivisionUnits object collection 900 contains InkDivisionUnit objects 1000 of different InkDivisionTypes.

Another property present in at least some examples of the InkDivisionUnit object 1000 is the RotationTransform property 1010. This property 1010 returns the transformation matrix information required, for example, to rotate the strokes in the InkDivisionUnit object 1000 to horizontal. It may be used, for example, for rotating ink strokes in this object 1000 to a horizontal base line before sending them to a recognizer. The output data from this property 1010 may take on the following format, at least in some examples of the invention:

[propget] HRESULT RotationTransform([out,retval]InkTransform* Rotation Transform The availability of output data from the RotationTransform property 1010 is illustrated in FIG. 10 by output arrow 1036.

The RotationTransform property 1010 available, in at least some examples of the invention, may expose an advantageous feature present in some application programs wherein handwriting that is not written horizontally can still be accurately parsed. In general, many known handwriting recognizers do not internally handle non-horizontal written lines very well, and the best recognition results generally are obtained in such products only when the baseline for the handwriting is horizontal. In some parser systems, however, the parser will automatically calculate or determine a baseline and apply a rotation transform as needed in order to obtain data corresponding to a horizontal line, and thereby improving the handwriting recognition capabilities of the handwriting recognizer. The RotationTransform property 1010 allows client code to determine whether handwritten information was collected horizontal. Such client code may use this property to "clean up" an end-user's handwriting by leveling it and/or to accurately draw lines or other shapes around the user's handwriting.

In some examples of the invention, it may be possible for individual InkDivisionUnit objects 1000 to exist in the same InkDivisionUnits collection 900 but have different RotationTransform properties 1010. For example, if a user wrote in a circle and asked for all the words, the InkDivisionUnits collection 900 would contain all the words, and each InkDivisionUnit object 1000 may have a different baseline angle in its RotationTransform property 1010.

Notably, the RotationTransform property 1010 may not be relevant for all InkDivisionUnit objects 1000. For example, this property 1010 may be relevant for the InkDivisionUnit "Word" and the InkDivisionUnit "Line," but not necessarily for "Drawing" or "Paragraph." If desired, for the InkDivisionUnit DivisionType of "Paragraph," the parser could, without departing from the invention, compute a rotational angle of the paragraph based on its individual, constituent lines. Also, if desired, the parser could compute the rotational angle of a drawing, at least in some instances, from patterns observed in its strokes. Therefore, while the RotationTransform property 1010 may be present for all InkDivisionTypes, this is not necessarily the case.

The InkDivisionUnit object 1000 further includes an Enum 1020 called InkDivisionType 1022, as illustrated in FIG. 10. The desired InkDivisionType may be set by client or application program code, by default, or in any other appropriate manner. In its output (represented by output arrow 1038), this Enum 1022 describes the type of InkDivisionUnits desired from a parsing operation. This information may be used, for example, by an InkDivisionResult.ResultByType operation. As one example, the InkDivisionTypes for this Enum 1020 may be defined as follows:

InkDivisionType for Word=0
InkDivisionType for Line=1
InkDivisionType for Paragraph=2
InkDivisionType for Drawing=3.

Of course, other emums could be used without departing from the invention. For example, an enum "Segment" could be used to correspond to either a word or character, particularly for use in systems designed for Far East languages.

As another example, if it is possible for a given InkDivisionUnits object collection to contain InkDivisionUnit objects of different InkDivisionTypes, then the specific values for entries in this Enum may change, for example, to something like the following:

All InkDivisionTypes=0
InkDivisionType for Word=1
InkDivisionType for Line=2
InkDivisionType for Paragraph=4
InkDivisionType for Drawing=8.

In this manner, the InkDivisionType may become a bitfield and individual types can be OR'ed together to specify a combination of InkDivisionTypes that are desired from the ResultByType operation.

Of course, without departing from the invention, an InkDivisionUnit object 1000 may include properties, methods, enums, and/or other elements in addition to and/or in place of and/or in combination with the specific properties and enums illustrated in FIG. 10.

V. Operation of an Ink Divider Object and API

A. Performance During an Inking Session

In use, ink strokes may be added to, removed from, and/or otherwise modified within the InkDivider object 700 Strokes property 704 collection in any suitable manner without departing from this invention. For example, if desired, a completely new Strokes property 704 could be written and inserted each time a stroke is added, removed, and/or otherwise modified in an existing Strokes property 704. Proceeding in this manner, however, would likely result in unacceptable processing delays as the computer would need to re-parse all of the ink strokes in the Strokes property 704 from scratch each time a stroke was changed.

Accordingly, in some examples of the invention, the client code (or application program code) that uses the InkDivider object 700 includes methods for: (a) adding individual ink strokes, (b) adding sets of ink strokes (e.g., by a paste operation), (c) removing ink strokes, and (d) removing sets of ink strokes (e.g., by a cut operation) to/from the InkDivider object's Strokes property collection 704, rather than replacing the entire Strokes property collection 704 each time a stroke is added, removed, or otherwise modified. By using methods that add, remove, and otherwise modify only affected strokes in a current InkDivider object's Strokes property 704, the internal parse tree data structure may be updated incrementally. For example, as a stroke is added to a previously-parsed line (perhaps to cross a "t"), if the new stroke is passed to InkDivider Object 700 using an "add" method (e.g., via an "Ink Divider.Strokes.Add(newstroke)" operation), then the internal parser's parse tree data structure may be invalidated within a predetermined distance from the location of the new stroke(s), and thereby allow strokes only in the immediate area of the new strokes (also called the "dirty" strokes or "dirty nodes") to be re-parsed, i.e., the new stroke associated with the letter "t" and other closely surrounding strokes, in this example. In some examples of this incremental stroke parsing, not only the actual newly added ink stroke gets parsed, but additional ink strokes in the neighborhood of the new stroke also get re-parsed taking into consideration the presence of the new stroke. In some examples of the invention, a circular region around the newly added, deleted, and/or otherwise modified stroke(s) will be reparsed (to assure that the newly added, deleted, or modified strokes are viewed in context with their surrounding strokes and to assure that the surrounding strokes are viewed in context with the recent modification).

Also, in some examples, systems and methods according to the invention perform as much parsing as possible in the background, without waiting for the Divide method to be explicitly called by the client code or application program code. For example, when either the InkDivider object's Strokes property 704 is set, or strokes are added to/removed from/otherwise modified in the InkDivider object's Strokes property 704, parsing occurs immediately, in a background thread on a "snapshot" of the parse tree data structure, as generally discussed above in conjunction with FIG. 4. Therefore, when the client code or application program code actually calls the Divide method (e.g., at the end of an inking session), the InkDivider object 700 only has to (a) finish parsing the most recently-added/deleted/modified strokes (i.e., focusing on the "dirty nodes," if there are any), and then (b) create and return the new InkDivisionResult object 800.

B. Performance When Returning to an Inking Session

If user applications expect to enter and exit inking sessions multiple times and "commit" ink objects to the application, the InkDivider object 700 could be called upon to re-parse all of the existing data from scratch every time an application program opens an ink-containing document. While this may be acceptable in some situations, performance may suffer and result in processing delays, particularly when opening documents that contain large amounts of ink data.

In at least some examples of the invention, in order to improve performance in these situations where existing documents are re-opened, the following options may be useful.

1. Retaining Shadow Objects

As an application program exits an inking session and commits ink data to the screen, in at least some examples of the invention, it may be useful to create and maintain copies of the strokes in the Strokes property collections 1004 of each InkDivisionUnit object 1000, rather than cutting these original strokes from the collection.

Applications of this nature may be designed to maintain shadow ink objects of all ink strokes requiring parsing, as well as the InkDivider object 700 and its Strokes property collection 704 (strokes attached to the ink divider) at all times. When the Divide method is called (e.g., at the end of an inking session), the application should copy, rather than cutting, the ink objects from the shadow object into their native application objects.

If any ink in the application objects is edited while not in an inking session (e.g., by performing other operations such as scaling or rotating), the application in this example of the invention may be required to remove and re-add the strokes corresponding to this application object to the shadow collection. For example, if a drawing object provided in a word processing program is repositioned, the shadow ink object will need to be updated to reflect this repositioning.

Upon returning to an inking session, only new strokes would need to be added or removed before the Divide method 710 is called again. This permits incremental processing of ink between inking sessions.

In general, to support incremental parsing, only a single shadow Ink object is required, such that two physical copies of a given Ink object exist and must be synchronized. In the case of a drawing application program that takes the results of the InkDivider object 700 and creates separate Ink objects for each of the InkDivisionUnit objects 1000 (so that they can be individually activated and edited as drawing elements), a single shadow Ink object is required for each Ink object that the drawing application program creates, but overall there are still only two copies of the ink.

The advantage to this method is the performance gain when moving between inking sessions. The disadvantages are the memory footprint and burden of keeping collections of ink objects in sync.

2. Reduction Heuristics

Another possibility for improving parsing performance when returning to an inking session (after exiting the session) is to reduce the data set on which the parser is required to work. For example, it is possible to implement heuristics that determine whether a "committed" ink object will benefit from re-parsing. As one example illustration, an application could limit re-parsing to only "committed" ink objects that intersect with new ink or are located with a certain spatial distance of the new ink. In some cases, depending on the scenario and/or implementation, z-order of "committed" ink objects also may be a factor in re-parsing.

While this approach initially may seem easier than the shadow object approach discussed above, care must be taken to ensure that most, if not all, of the strokes pertaining to the InkDivisionUnits that the InkDivider would modify be included in the reduction heuristics. Failure to do this could result in inconsistencies in the parsing results, and hence, the end-user's inking experience.

Furthermore, the internal parser itself is really in a better position to decide which strokes should be included, because it knows the invalidation scheme that will be used to decide what strokes to re-parse. One invalidation schemes uses radial invalidation, but other schemes may be used without departing from the invention.

VI. Application Programming Interfaces

Numerous application programming interfaces ("APIs") are possible to leverage various capabilities of the Ink API. Some examples include:

(a) Events: In some examples of the invention, completion of various portions of a parsing operation (e.g., the Divide method 800 described above) may trigger various events, for example, to notify the client code that at least a portion of the parsing operation is completed, that at least some parsing results are available, and/or that the parser can be called again. Examples of such events include "ParsingComplete" and "DivisionComplete" events. A "ParsingComplete" event, as used in some examples of the invention, informs the application program that the input ink strokes have been partitioned into their respective locations in the parse tree data structure (e.g., like that shown in FIG. 6B). At this time in this example of the invention, the recognizer has not yet acted on the ink stroke data, so individual word-by-word results are not yet available. A "DivisionComplete" event, on the other hand, may be used to inform the application program that the entire parsing and recognition operations are complete. In the above-described example, when a DivisionComplete event is fired, this tells the application code that an InkDivisionResult object 800 is immediately available, and its ResultByType method can be used to retrieve InkDivisionUnit objects for the desired parsing granularity.

(b) Factoid: Factoids can be used to steer recognition, e.g., by informing the parser of expected information or patterns in the ink to be recognized. For example, a factoid may inform a parser that an incoming string was in a field for a zip code. The parser could then look for a familiar five number or nine number patterns. Additionally, the parser could preferentially recognize characters as numbers when coming in the zip code field (e.g., preferentially recognizing an s-shaped stroke as the number "5" rather than the letter "S," and/or preferentially recognizing the number "1" rather than the small letter "1" or a capital "I."

(c) Shadow Objects: The InkDivider object 700, in at least some examples, may provide a method to cause it to create an internal Shadow Ink Object to which it refers instead of an externally managed Ink object. Of course, InkDivider (or the related shadow ink manager object) would also provide accessors to the shadow Ink object(s) and methods to manage them.

(d) Reduction Heuristics: The parser's API also may be expanded, at least in some examples of the invention, to include "recommended" data set reduction mechanisms, such that if a developer's application requirements were compatible, the developer would not need to worry about reduction heuristics and instead tell the parser to do its best.

(e) Parser Replacement: To allow third parties to use any recognizer or parser that they wish, the parser API may include "plug-in" support for new recognizers and parsers to be downloaded by the user. These alternative parsing engines would naturally have object models of their own, analogous to the RecognizerContext object of the API described above.

VII. An Alternative Ink Divider Object

Figure 11:
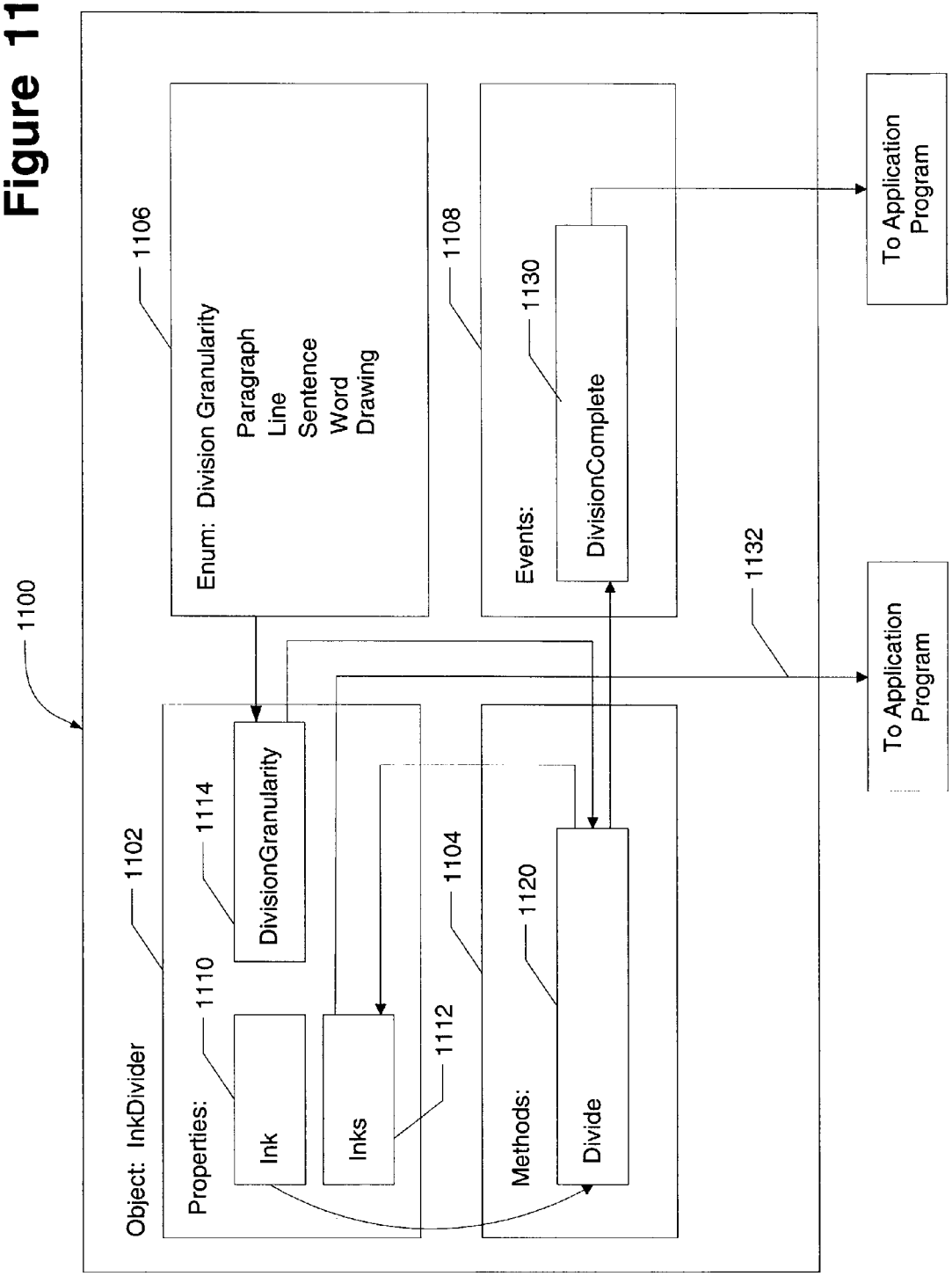
FIG. 11 illustrates another example of an InkDivider object used in some examples of the present invention.

FIGS. 7–10 illustrate an example of an ink divider object and certain objects that relate to it in accordance with some examples of this invention. FIG. 11 provides another example of an InkDivider object 1100. This sample object 1100 may include various properties 1102, methods 1104, Enums 1106, and Events 1108, each of which is described in more detail below.

The "Ink" property 1110 returns/sets a reference to an ink object or the strokes to be processed. This property 1110 is akin to the Strokes property 704 discussed above. The "Inks" property 1112 returns a collection of ink objects generated by the Divide method 1120 (discussed in more detail below). The DivisionGranularity property 1114 gets/sets the granularity by which the ink in the Ink property 1110 will be parsed by the Divide method 1120. While any default value (or even no default value) could be used without departing from the invention, in some examples of this invention the DivisionGranularity property 1114 will default to a "Word" granularity. The DivisionGranularity property 1114 can be set using the DivisionGranularity Enum 1106, which may include, for example, Enums representing "Paragraphs," "Lines," "Sentences," "Words," "Drawings," etc. The desired DivisionGranularity may be set by the client or application program code, through default, or in any other appropriate manner.

The Divide method 1120 performs the ink parsing operation on the ink strokes present in the Ink property 1110 based on the set DivisionGranularity property 1114. The DivisionComplete event 1130 will be fired to inform the application program when the Divide method 1120 has completed its operation. The parsed results from the Divide method 1120 are written to the Inks property 1112 and may be made available to the application program or client code from there, as illustrated by arrow 1132. Once the client code or application program code receives the DivisionComplete event 1130, it knows it can retrieve the Inks property 1112 and retrieve the results of the parsing operation.

Depending on the specifics of the implementation, the Inks property 1112 may or may not be accessible while the parsing operation (i.e., the Divide method 1120) is being performed and the internal parse tree representation of the ink is being constructed.

Of course, without departing from the invention, an InkDivider Object 1100 may include properties, methods, enums, events, and/or other elements in combination with and/or in addition to and/or in place of the specific properties, methods, emums, and events illustrated in FIG. 11.

VIII. Conclusion

While the invention has been described in terms of various specific examples, these specific examples merely exemplify the invention and do not limit it. Those skilled in the art will recognize, for example, that while various specific names are used for objects, properties, methods, enums, events, and the like in this specification, these specific names are merely examples of possible names and should not be construed as limiting the invention. Of course, other names may be used for objects, properties, methods, emums, events, and the like without departing from this invention. Additionally, the specific arrangement of objects, properties, methods, enums, events, and like may differ from the specific arrangements described and illustrated without departing from the invention.

Additionally, the fact that a specific feature or function of the invention is described in conjunction with a specific example does not mean that this feature or function is limited to use with that specific example of the invention or that every example must include that specific feature or function. Rather, unless otherwise specified, the various features and functions described above may be used freely in any example of the invention. Those skilled in the art will appreciate that changes and modifications may be made to the exemplified versions of the invention without departing from the spirit and scope of the invention, as defined in the appended claims.

We claim:

1. A method of making information available to an application program, comprising:
   storing a plurality of ink strokes;
   issuing a divide request;
   in response to the divide request, grouping the stored ink strokes into one or more groupings of strokes having at least a first predetermined granularity; and
   making information regarding the one or more groupings of strokes available to the application program, wherein the information made available to the application program includes information indicating a number of groupings of strokes having the first predetermined granularity.

2. A method according to claim 1, wherein the information made available to the application program includes at least one of the one or more groupings of strokes.

3. A method according to claim 1, wherein the information made available to the application program includes machine-generated text that corresponds to at least one of the one or more groupings of strokes.

4. A method according to claim 1, further comprising:
   informing the application program when the grouping has been completed.

5. A method according to claim 1, wherein at least a portion of the information regarding the one or more groupings of strokes made available to the application program is stored in an ink division result object.

6. A method according to claim 1, wherein language is at least one factor considered in grouping the stored ink strokes into one or more groupings of strokes having the first predetermined granularity.

7. A method according to claim 1, wherein the first predetermined granularity is selected from the group consisting of: word, line, paragraph, sentence, and drawing.

8. A method according to claim 1, wherein the grouping additionally groups the stored ink strokes into one or more groupings of strokes having at least a second predetermined granularity.

9. A method according to claim 1, further comprising:
making information regarding one or more groupings of strokes having a second predetermined granularity available to the application program.

10. A method according to claim 1, further comprising:
changing the stored ink strokes to produce a modified ink stroke set;
issuing a second divide request; and
in response to the second divide request, grouping the modified ink stroke set into one or more groupings.

11. A computer-readable medium having computer-executable instructions for performing a method of making information available to an application program, the method comprising:
storing a plurality of ink strokes;
receiving a divide request;
in response to the divide request, grouping the stored ink strokes into one or more groupings of strokes having at least a first predetermined granularity;
making information regarding the one or more groupings of strokes available to the application program, wherein the information regarding the one or more groupings of strokes includes information indicating a number of groupings of strokes having the first predetermined granularity.

12. A computer-readable medium according to claim 11, wherein the information made available to the application program includes at least one of the one or more groupings of strokes.

13. A computer-readable medium according to claim 11, wherein the information made available to the application program includes machine-generated text that corresponds to at least one of the one or more groupings of strokes.

14. A computer-readable medium according to claim 11, wherein the method further includes:
informing the application when the grouping has been completed.

15. A computer-readable medium according to claim 11, wherein at least a portion of the information regarding the one or more groupings of strokes made available to the application program is stored in an ink division result object.

16. A computer-readable medium according to claim 11, wherein language is at least one factor considered in grouping the stored ink strokes into one or more groupings of strokes having the first predetermined granularity.

17. A computer-readable medium according to claim 11, wherein the first predetermined granularity is selected from the group consisting of: word, line, paragraph, sentence, and drawing.

18. A computer-readable medium according to claim 11, wherein the grouping additionally groups the stored ink strokes into one or more groupings of strokes having at least a second predetermined granularity.

19. A computer-readable medium according to claim 11, wherein the method further includes:
making information regarding one or more groupings of strokes having a second predetermined granularity available to the application program.

20. A computer-readable medium according to claim 11, wherein the method further includes:
receiving a modified ink stroke set;
receiving a second divide request; and
in response to the second divide request, grouping the modified ink stroke set into one or more groupings.

21. A method of communicating between an application and an ink divider object, the ink divider object storing ink strokes to be divided into groups, comprising:
issuing a divide request to the ink divider object;
in response to the divide request, calling a divide method, which groups the stored ink strokes into one or more groupings of strokes having at least a first predetermined granularity; and
making information regarding the one or more groupings of strokes available to the application, wherein the information regarding the one or more groupings of strokes includes information indicating a number of groupings of strokes having the first predetermined granularity.

22. A method according to claim 21, wherein the information made available to the application includes at least one of the one or more groupings of strokes.

23. A method according to claim 21, wherein the information made available to the application includes machine-generated text that corresponds to at least one of the one or more groupings of strokes.

24. A method according to claim 21, further comprising:
informing the application when the divide method has been completed.

25. A method according to claim 21, wherein at least a portion of the information regarding the one or more groupings of strokes made available to the application is stored in an ink division result object.

26. A method according to claim 21, wherein during operation of the divide method, language is at least one factor considered in grouping the stored ink strokes into one or more groupings of strokes having the first predetermined granularity.

27. A method according to claim 21, wherein the first predetermined granularity is selected from the group consisting of: word, line, paragraph, sentence, and drawing.

28. A method according to claim 21, wherein during operation of the divide method, the divide method additionally groups the stored ink strokes into one or more groupings of strokes having at least a second predetermined granularity.

29. A method according to claim 21, further comprising:
making information regarding one or more groupings of strokes having a second predetermined granularity available to the application.

30. A method according to claim 21, further comprising:
changing the stored ink strokes to produce a modified ink stroke set;
issuing a second divide request to the ink divider object; and
in response to the second divide request, calling the divide method, which groups the modified ink stroke set into one or more groupings.

31. A computer-readable medium having computer-executable instructions for performing a method of communicating between an application and an ink divider object, the ink divider object storing ink strokes to be divided into groups, the method comprising:

issuing a divide request to the ink divider object;

in response to the divide request, calling a divide method, which groups the stored ink strokes into one or more groupings of strokes having at least a first predetermined granularity; and making information regarding the one or more groupings of strokes available to the application, wherein the information regarding the one or more groupings of strokes includes information indicating a number of groupings of strokes having the first predetermined granularity.

32. A computer-readable medium according to claim 31, wherein the information made available to the application includes at least one of the one or more groupings of strokes.

33. A computer-readable medium according to claim 31, wherein the information made available to the application includes machine-generated text that corresponds to at least one of the one or more groupings of strokes.

34. A computer-readable medium according to claim 31, wherein the method of communicating further includes:

informing the application when the divide method has been completed.

35. A computer-readable medium according to claim 31, wherein at least a portion of the information regarding the one or more groupings of strokes made available to the application is stored in an ink division result object.

36. A computer-readable medium according to claim 31, wherein during operation of the divide method, language is at least one factor considered in grouping the stored ink strokes into one or more groupings of strokes having the first predetermined granularity.

37. A computer-readable medium according to claim 31, wherein the first predetermined granularity is selected from the group consisting of: word, line, paragraph, sentence, and drawing.

38. A computer-readable medium according to claim 31, wherein during operation of the divide method, the divide method additionally groups the stored ink strokes into one or more groupings of strokes having at least a second predetermined granularity.

39. A computer-readable medium according to claim 31, wherein the method of communicating further includes:

making information regarding one or more groupings of strokes having a second predetermined granularity available to the application.

40. A computer-readable medium according to claim 31, wherein the method of communicating further includes:

receiving changes to the stored ink strokes to produce a modified ink stroke set;

issuing a second divide request to the ink divider object; and in response to the second divide request, calling the divide method, which groups the modified ink stroke set into one or more groupings.

* * * * *